United States Patent
Nagao

(10) Patent No.: US 10,276,124 B2
(45) Date of Patent: *Apr. 30, 2019

(54) LIQUID CRYSTAL DISPLAY DEVICE

(71) Applicant: Japan Display Inc., Tokyo (JP)

(72) Inventor: Shouji Nagao, Chiba (JP)

(73) Assignee: Japan Display Inc., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/122,061

(22) Filed: Sep. 5, 2018

(65) Prior Publication Data

US 2019/0005913 A1    Jan. 3, 2019

Related U.S. Application Data

(63) Continuation of application No. 15/805,204, filed on Nov. 7, 2017, now Pat. No. 10,096,295, which is a
(Continued)

(30) Foreign Application Priority Data

May 31, 2012  (JP) .................................. 2012-123908

(51) Int. Cl.
  *G06F 3/041* (2006.01)
  *G09G 3/36* (2006.01)
  (Continued)

(52) U.S. Cl.
  CPC .......... *G09G 3/3696* (2013.01); *G06F 1/3262* (2013.01); *G06F 1/3265* (2013.01);
  (Continued)

(58) Field of Classification Search
  CPC ........... G09G 3/3696; G09G 2330/021; G09G 2300/0426; G06F 3/0412; G06F 1/3265;
  (Continued)

(56) References Cited

U.S. PATENT DOCUMENTS

2007/0268206 A1  11/2007 Kinoshita et al.
2008/0303750 A1  12/2008 Ludden et al.
(Continued)

FOREIGN PATENT DOCUMENTS

JP    2001-249317 A    9/2001
JP    2001-345928 A   12/2001
(Continued)

OTHER PUBLICATIONS

Japanese Office Action dated Apr. 5, 2016 regarding corresponding Japanese Patent Application No. 2012-123908, with partial English translation.

*Primary Examiner* — Ibrahim A Khan
(74) *Attorney, Agent, or Firm* — Typha IP LLC

(57) ABSTRACT

In a liquid crystal display (LCD) device having a touch panel function, power consumption is reduced in the standby state. The display section is divided into blocks each of which is formed of a plurality of display lines. The counter electrode is disposed for each block. A driving circuit selectively supplies, to the counter electrode of each block, the voltage used for the liquid crystal display and the voltage used for the touch panel scanning. The driving circuit has a source amplifier that supplies the video voltages to the video lines. The driving circuit reduces the current in the source amplifier, such that the current is lower than current at the time of a normal operation, to lower the power consumption, and stops the operation of the source amplifier and supplies the GND voltage to the video lines to further lower the power consumption.

15 Claims, 24 Drawing Sheets

| | ITEM | NORMAL SPECIFI-CATION | LOW POWER CONSUMPTION MODE 1 | LOW POWER CONSUMPTION MODE 2 | LOW POWER CONSUMPTION MODE 3 | LOW POWER CONSUMPTION MODE 4 |
|---|---|---|---|---|---|---|
| | | | ·COLUMN DRIVING & 8-COLOR MODE | ·COLUMN DRIVING & 8-COLOR MODE ·REDUCING SOURCE DRIVING CAPABILITY | ·COLUMN DRIVING & 8-COLOR MODE ·REDUCING SOURCE DRIVING CAPABILITY ·INTERMITTENTLY WRITING DRIVE ·REDUCING GATE DRIVING CAPABILITY | ·COLUMN DRIVING & 8-COLOR MODE ·REDUCING SOURCE DRIVING CAPABILITY ·INTERMITTENTLY WRITING DRIVE ·REDUCING GATE DRIVING CAPABILITY ·STOPPING AMPLIFIER FOR PIXEL WRITING |
| AC DRIVING METHOD | DOT INVERSION | ○ | — | — | — | — |
| | COLUMN INVERSION | (○) | ○ | ← | ← | ← |
| VSP/VSN GENERATION CIRCUIT | BOOSTING PERIOD | NORMAL | NORMAL | LOW FREQUENCY DRIVING | ← | ← |
| | VSP OFF | ON | ON | ON | ON | ON |
| | VSN OFF | ON | ON | ON | ON | OFF |
| VGH/VGL GENERATION CIRCUIT | BOOSTING PERIOD | NORMAL | NORMAL | NORMAL | LOW FREQUENCY DRIVING | ← |
| AMPLIFIER | SOURCE AMPLIFIER CIRCUIT | NORMAL | NORMAL | LOW CURRENT ADJUSTMENT | ← | OFF (GND OUTPUT) |
| | GRADATION VOLTAGE GENERATION CIRCUIT | NORMAL | ONLY TOP/BOTTOM AMPLIFIERS ON | LOW CURRENT ADJUSTMENT | ← | OFF (GND OUTPUT) |
| | COMMON AMPLIFIER OFF (GND OUTPUT) | ON | ON | ON | ON | OFF (GND OUTPUT) |

Related U.S. Application Data continuation of application No. 14/706,703, filed on May 7, 2015, now Pat. No. 9,847,071, which is a continuation of application No. 13/851,229, filed on Mar. 27, 2013, now Pat. No. 9,082,367.

(51) Int. Cl.
  *G06F 3/047* (2006.01)
  *G06F 3/044* (2006.01)
  *G06F 1/3234* (2019.01)

(52) U.S. Cl.
  CPC ............... *G06F 3/044* (2013.01); *G06F 3/047* (2013.01); *G06F 3/0412* (2013.01); *G09G 2300/0426* (2013.01); *G09G 2330/021* (2013.01); *Y02D 10/153* (2018.01); *Y02D 50/20* (2018.01)

(58) Field of Classification Search
  CPC ........ G06F 3/044; G06F 3/047; G06F 1/3262; Y02D 50/20; Y02D 10/153
  See application file for complete search history.

(56) References Cited

U.S. PATENT DOCUMENTS

| | | |
|---|---|---|
| 2009/0256818 A1 | 10/2009 | Noguchi et al. |
| 2010/0110040 A1 | 5/2010 | Kim et al. |
| 2011/0043483 A1 | 2/2011 | Mizuhashi et al. |
| 2011/0128428 A1 | 6/2011 | Takatoku et al. |
| 2012/0038618 A1 | 2/2012 | Koyama |
| 2012/0044195 A1 | 2/2012 | Nakanishi et al. |

FOREIGN PATENT DOCUMENTS

| | | |
|---|---|---|
| JP | 2002-123234 A | 4/2002 |
| JP | 2002-268608 A | 9/2002 |
| JP | 2009-009122 A | 1/2009 |
| JP | 2009-258182 A | 11/2009 |
| JP | 2012-042861 A1 | 3/2012 |
| JP | 2012-063753 A | 3/2012 |
| WO | 2010/098199 A1 | 9/2010 |

PRIOR ART

PRIOR ART

FIG.24

| | ITEM | NORMAL SPECIFI-CATION | LOW POWER CONSUMPTION MODE 1 | LOW POWER CONSUMPTION MODE 2 | LOW POWER CONSUMPTION MODE 3 | LOW POWER CONSUMPTION MODE 4 |
|---|---|---|---|---|---|---|
| AC DRIVING METHOD | DOT INVERSION COLUMN INVERSION | ○ | ·COLUMN DRIVING & 8-COLOR MODE | ·COLUMN DRIVING & 8-COLOR MODE<br>·REDUCING SOURCE DRIVING CAPABILITY | ·COLUMN DRIVING & 8-COLOR MODE<br>·REDUCING SOURCE DRIVING CAPABILITY<br>·INTERMITTENTLY WRITING DRIVE<br>·REDUCING GATE DRIVING CAPABILITY | ·COLUMN DRIVING & 8-COLOR MODE<br>·REDUCING SOURCE DRIVING CAPABILITY<br>·INTERMITTENTLY WRITING DRIVE<br>·REDUCING GATE DRIVING CAPABILITY<br>·STOPPING AMPLIFIER FOR PIXEL WRITING |
| VSP/VSN GENERATION CIRCUIT | BOOSTING PERIOD | NORMAL | NORMAL | LOW FREQUENCY DRIVING | ← | ← |
| | VSP OFF | ON | ON | ON | ON | ON |
| | VSN OFF | ON | ON | ON | ON | OFF |
| VGH/VGL GENERATION CIRCUIT | BOOSTING PERIOD | NORMAL | NORMAL | NORMAL | LOW FREQUENCY DRIVING | ← |
| AMPLIFIER | SOURCE AMPLIFIER CIRCUIT | NORMAL | ONLY TOP/BOTTOM AMPLIFIERS ON | LOW CURRENT ADJUSTMENT | ← | ← |
| | GRADATION VOLTAGE GENERATION CIRCUIT | NORMAL | NORMAL | LOW CURRENT ADJUSTMENT | ← | OFF (GND OUTPUT) |
| | COMMON AMPLIFIER OFF (GND OUTPUT) | ON | ON | ON | ON | OFF (GND OUTPUT) |

LIQUID CRYSTAL DISPLAY DEVICE

CROSS-REFERENCE TO RELATED APPLICATIONS

This application is a continuation application of U.S. application Serial No. U.S. Ser. No. 15/805,204 filed on Nov. 7, 2017, which, in turn, is a continuation of application Ser. No. 14/706,703 (U.S. Pat. No. 9,847,071) filed on May 7, 2015, which, in turn, is a continuation of U.S. application Ser. No. 13/851,229 (U.S. Pat. No. 9,082,367) filed on Mar. 27, 2013, which claims priority from Japanese application JP2012-123908 filed on May 31, 2012, the entire contents of which are hereby incorporated by reference into this application.

BACKGROUND OF THE INVENTION

1. Field of the Invention

The present invention relates to a liquid crystal display device, and particularly to a technique that is effectively applied to an in-cell liquid crystal display device having a built-in touch panel.

2. Description of the Related Art

There are display devices having a device (hereinafter also referred to as a touch sensor or a touch panel) that inputs information by performing a touch operation (contact pressure operation, and hereinafter simply referred to as touch) on a display screen with a user's finger, a pen, or the like. The display devices are used in mobile electronics such as PDAs and portable terminals, various kinds of home appliances, automated teller machines, and the like.

As such a touch panel, an electrostatic capacitance type touch panel detecting a change in the capacitance of the touched portion is known.

Well known as the electrostatic capacitance type touch panel is a so-called in-cell liquid crystal display device of which a liquid crystal display panel has a touch panel function as disclosed in JP2009-258182A.

In the in-cell touch panel, the counter electrode (also referred to as a common electrode (CT)), which is formed on a first substrate (also referred to as a TFT substrate) constituting the liquid crystal display panel, is divided, and is also used to serve as scanning electrodes of the touch panel.

SUMMARY OF THE INVENTION

In the in-cell liquid crystal display device having a built-in touch panel, it is possible to reduce the number of components by forming a liquid crystal display panel driver IC, which drives the liquid crystal display panel, and a touch panel driver IC, which detects a touch position, as a common driver.

However, in the in-cell liquid crystal display device having the built-in touch panel, when the liquid crystal display panel driver IC and the touch panel driver IC are formed as a common driver, a voltage for driving the touch panel and a voltage for driving the liquid crystal display panel are made to be common.

The liquid crystal display device detects the touch position on the touch panel even in a standby state. Hence, there is a problem in that, in the standby state, the liquid crystal display device is in a display off state in which "black" is displayed on the liquid crystal display panel but nevertheless it is difficult to reduce power consumption in the liquid crystal display device.

The invention has been made to solve the problem in the related art, and it is an object of the invention to provide a technique, which is capable of reducing power consumption in the liquid crystal display device at the time when the display is off, which displays "black" on the liquid crystal display panel in the standby state, for the in-cell liquid crystal display device having the touch panel function.

The above object, other objects, and new features of the invention are clarified by description and accompanying drawings of the present specification.

Typical embodiments of the invention disclosed in the present application will be briefly described as follows.

(1) According to a first aspect of the invention, there is provided a liquid crystal display device including a liquid crystal display panel that has a first substrate, a second substrate, and a liquid crystal sandwiched between the first substrate and the second substrate, in which there is provided a display section formed of a plurality of pixels arranged in matrix, wherein the second substrate has detection electrodes of a touch panel, wherein the first substrate has a plurality of video lines which supply video voltages to the respective pixels, wherein each pixel has a pixel electrode and a counter electrode, wherein the display section is divided into a plurality of blocks each of which is formed of the pixels disposed on a plurality of display lines adjacent to one another, wherein the counter electrode is an electrode common to the pixels in each block, wherein the counter electrode of each block also functions as a scanning electrode of the touch panel, wherein the liquid crystal display device has a driving circuit which supplies the video voltages to the respective video lines and supplies a counter voltage and a touch panel scanning voltage to the counter electrodes of the respective blocks, wherein the driving circuit has a source amplifier circuit which supplies the video voltages to the video lines, wherein the source amplifier circuit has a current adjustment circuit capable of adjusting current flowing in the source amplifier circuit itself, and wherein the driving circuit causes the current adjustment circuit to reduce the current, which flows in the source amplifier circuit, such that the current is lower than current, which flows in the source amplifier circuit at the time of a normal operation, in a first low power consumption mode for achieving lower power consumption than the normal operation, and causes the current adjustment circuit to stop an operation of the source amplifier circuit and supply a GND voltage to the video lines in a second low power consumption mode for achieving lower power consumption than the first low power consumption mode.

(2) According to a second aspect of the invention, there is provided a liquid crystal display device including a liquid crystal display panel that has a first substrate, a second substrate, and a liquid crystal sandwiched between the first substrate and the second substrate, in which there is provided a display section formed of a plurality of pixels arranged in matrix, wherein the second substrate has detection electrodes of a touch panel, wherein each pixel has a pixel electrode and a counter electrode, wherein the display section is divided into a plurality of blocks each of which is formed of the pixels disposed on a plurality of display lines adjacent to one another, wherein the counter electrode is an electrode common to the pixels in each block, wherein the counter electrode of each block also functions as a scanning electrode of the touch panel, wherein the liquid crystal display device has a driving circuit which supplies a counter voltage and a touch panel scanning voltage to the counter electrodes of the respective blocks, wherein the driving circuit has a common amplifier circuit which supplies the counter voltage to the counter electrodes, wherein the common amplifier circuit has a current adjustment circuit capable of adjusting current flowing in the common amplifier circuit itself, and wherein the driving circuit causes the current adjustment circuit to stop an operation of the common amplifier circuit and supply a GND voltage to the counter electrodes in a low power consumption mode for achieving lower power consumption than a normal operation.

(3) According to a third aspect of the invention, there is provided a liquid crystal display device including a liquid crystal display panel that has a first substrate, a second substrate, and a liquid crystal sandwiched between the first substrate and the second substrate, in which there is provided a display section formed of a plurality of pixels arranged in matrix, wherein the second substrate has detection electrodes of a touch panel, wherein each pixel has a pixel electrode and a counter electrode, wherein the display section is divided into a plurality of blocks each of which is formed of the pixels disposed on a plurality of display lines adjacent to one another, wherein the counter electrode is an electrode common to the pixels in each block, wherein the counter electrode of each block also functions as a scanning electrode of the touch panel, wherein the liquid crystal display device has a driving circuit which supplies a counter voltage and a touch panel scanning voltage to the counter electrodes of the respective blocks, wherein the driving circuit has a gradation voltage generation circuit which generates a plurality of gradation voltages, wherein the gradation voltage generation circuit has a plurality of amplifier circuits which output the plurality of gradation voltages, wherein each amplifier circuit has a current adjustment circuit capable of adjusting current flowing in the amplifier circuit itself, and wherein the driving circuit causes the current adjustment circuit of a middle amplifier circuit other than a top amplifier circuit, which outputs a highest gradation voltage, and a bottom amplifier circuit, which outputs a lowest gradation voltage, among the plurality of amplifier circuits, to stop an operation of the corresponding middle amplifier circuit, in a first low power consumption mode for achieving lower power consumption than a normal operation, causes the current adjustment circuit of the middle amplifier circuit to stop the operation of the corresponding middle amplifier circuit and causes the current adjustment circuits of the top amplifier circuit and the bottom amplifier circuit to reduce current, which flows in the top amplifier circuit and the bottom amplifier circuit, such that the current is lower than current, which flows in the amplifier circuit at the time of the normal operation, in a second low power consumption mode for achieving lower power consumption than the first low power consumption mode, and causes the current adjustment circuits of the respective amplifier circuits, which output the plurality of gradation voltages, to stop operations of the respective amplifier circuits and supply a GND voltage as the lowest gradation voltage, in a third low power consumption mode for achieving lower power consumption than the second low power consumption mode.

(4) According to a fourth aspect of the invention, there is provided a liquid crystal display device including a liquid crystal display panel that has a first substrate, a second substrate, and a liquid crystal sandwiched between the first substrate and the second substrate, in which there is provided a display section formed of a plurality of pixels arranged in matrix, wherein the second substrate has detection electrodes of a touch panel, wherein the first substrate has a plurality of scanning lines which supply a selection scanning voltage VGH and a non-selection scanning voltage VGL to the respective pixels, wherein each pixel has a pixel electrode and a counter electrode, wherein the display section is divided into a plurality of blocks each of which is formed of the pixels disposed on a plurality of display lines adjacent to one another, wherein the counter electrode is an electrode common to the pixels in each block, wherein the counter electrode of each block also functions as a scanning electrode of the touch panel, wherein the corresponding liquid crystal display device has a driving circuit which outputs the VGH and the VGL and supplies a counter voltage and a touch panel scanning voltage to the counter electrodes of the respective blocks, and wherein the driving circuit has a charge-pump VGH/VGL generation circuit which generates the VGH and the VGL, and sets an ON/OFF period of a switching circuit in the VGH/VGL generation circuit such that the ON/OFF period is longer than an ON/OFF period at the time of a normal operation, in a low power consumption mode for achieving lower power consumption than the normal operation.

(5) According to a fifth aspect of the invention, there is provided a liquid crystal display device including a liquid crystal display panel that has a first substrate, a second substrate, and a liquid crystal sandwiched between the first substrate and the second substrate, in which there is provided a display section formed of a plurality of pixels arranged in matrix, wherein the second substrate has detection electrodes of a touch panel, wherein the first substrate has a plurality of video lines which supply video voltages to the respective pixels, wherein each pixel has a pixel electrode and a counter electrode, wherein the display section is divided into a plurality of blocks each of which is formed of the pixels disposed on a plurality of display lines adjacent to one another, wherein the counter electrode is an electrode common to the pixels in each block, wherein the counter electrode of each block also functions as a scanning electrode of the touch panel, wherein the liquid crystal display device has a driving circuit which supplies the video voltages to the respective video lines and supplies a counter voltage and a touch panel scanning voltage to the counter electrodes of the respective blocks, wherein the driving circuit has a source amplifier circuit which supplies the video voltages to the video lines, and a VSP generation circuit, which supplies a high potential voltage VSP to the source amplifier circuit, and a VSN generation circuit which supplies a low potential voltage VSN to the source amplifier circuit, wherein the VSP generation circuit and the VSN generation circuit are switching-regulator-type step-up circuits, and wherein the driving circuit reduces switching frequencies of the VSP generation circuit and the VSN generation circuit, in a first low power consumption mode for achieving lower power consumption than the normal operation, and reduces the switching frequency of the VSP generation circuit and stops an operation of the VSN generation circuit, in a second low power consumption mode for achieving lower power consumption than the first low power consumption mode.

The typical effects, which can be obtained by the invention disclosed in the present application, will be briefly described as follows.

According to the liquid crystal display device having the touch panel function of the invention, it is possible to reduce power consumption in the liquid crystal display device at the time when the display is off which displays "black" on the liquid crystal display panel in the standby state.

BRIEF DESCRIPTION OF THE DRAWINGS

FIG. 24 is an explanatory diagram illustrating combinations of various kinds of adjustment circuit states for achieving lower power consumption in the standby state in the liquid crystal display device according to the example of the invention.

DETAILED DESCRIPTION OF THE INVENTION

Figure 1:
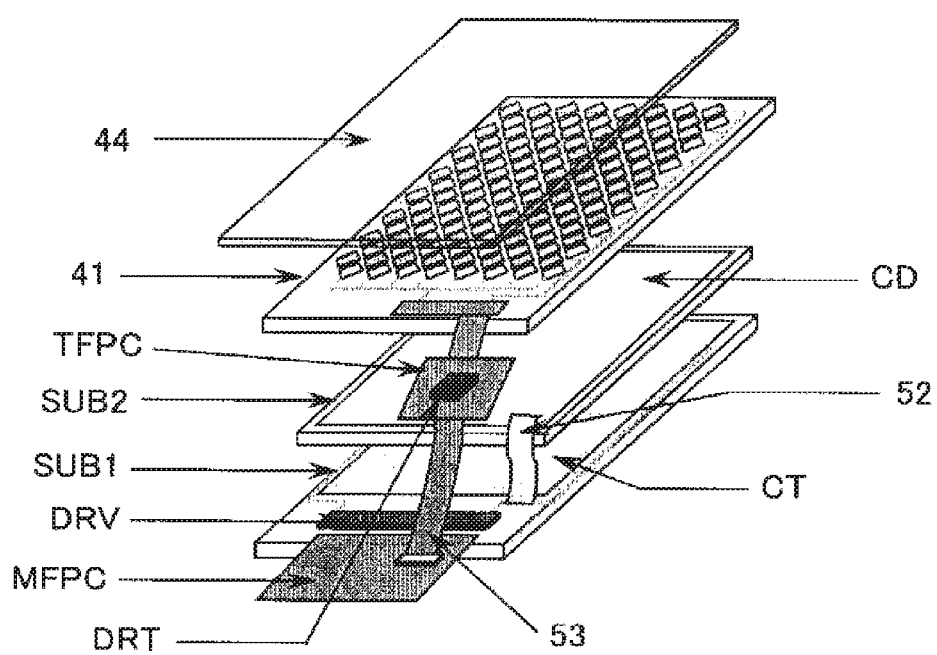
FIG. 1 is an exploded perspective view illustrating a schematic configuration of a touch-panel-attached liquid crystal display device according to an example of the related art.

Hereinafter, examples of the invention will be described in detail with reference to the accompanying drawings.

It should be noted that, in overall diagrams for describing the examples, the components having the same function are represented by the same reference numerals and signs, and the repeated description will be omitted. Further, the following examples do not limit interpretation of claims of the invention.

Figure 2:
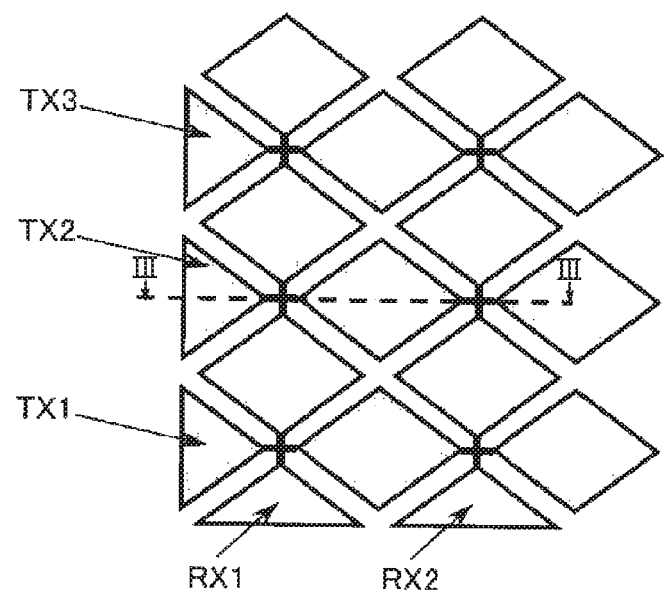
FIG. 2 is a top plan view illustrating an electrode configuration of the touch panel shown in FIG. 1.
Figure 3:
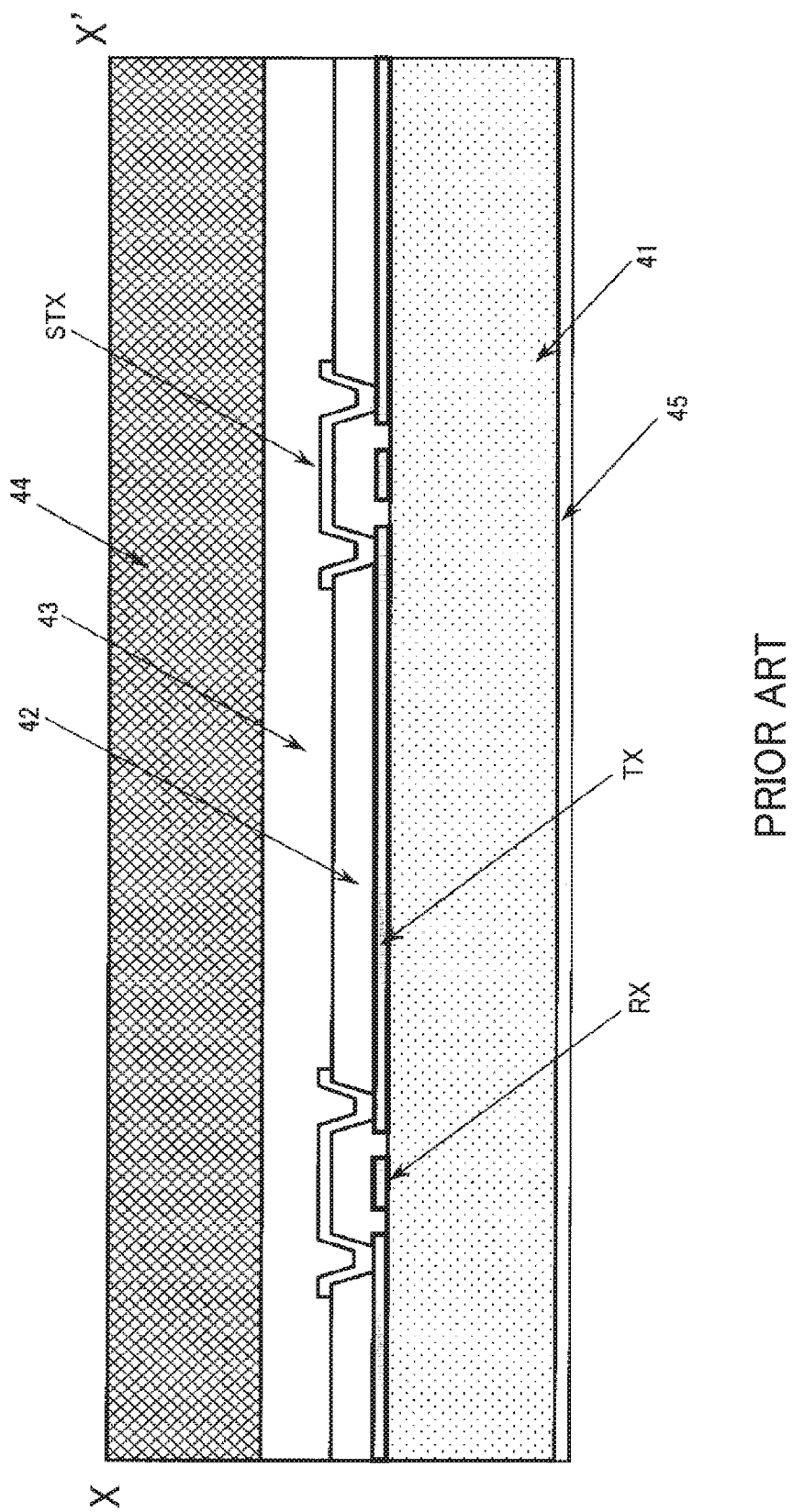
FIG. 3 is a cross-sectional view illustrating a cross-section structure of the touch panel shown in FIG. 1.

FIG. 1 is an exploded perspective view illustrating a schematic configuration of a touch-panel-attached liquid crystal display device according to an example of the related art. FIG. 2 is a top plan view illustrating an electrode configuration of the touch panel shown in FIG. 1. FIG. 3 is a cross-sectional view illustrating a cross-section structure of the touch panel shown in FIG. 1.

Generally, as shown in FIG. 2, the touch panel has scanning electrodes (TX) and detection electrodes (RX) for detecting capacitances. In the drawing, for example, the number of the scanning electrodes (TX) is three (TX1 to TX3), and the number of the detection electrodes (RX) is two (RX1, RX2), but the number of electrodes is not limited to this.

Further, as shown in FIGS. 1 and 3, the touch panel includes: a touch panel substrate 41; the scanning electrodes (TX) and the detection electrodes (RX) formed on the touch panel substrate 41; an interlayer insulation film 42 formed on the scanning electrodes (TX) and the detection electrodes (RX); connection portions (STX) that are formed on the interlayer insulation film 42 and electrically connect the scanning electrodes (TX); a passivation film 43 formed on the connection portion (STX); a front window (or, protection film) 44 disposed on the passivation film 43; and a transparent electrode 45 that serves as a shield formed of for example an ITO (Indium Tin Oxide) film on the liquid crystal display panel side of the touch panel substrate 41.

In the touch panel of the related art, a touch panel control IC (DRT) performs pulse driving of the scanning electrodes (TX) with a voltage of about 5V to 10V, and the touch panel control IC (DRT) detects changes in the voltages of the detection electrodes (RX), thereby detecting the touch position. That is, the capacitance value between the scanning electrode (TX) and the detection electrode (RX) is changed by a finger or the like, the voltage, which is detected by the detection electrode (RX) when the scanning electrode (TX) is pulse-driven, is changed, and the voltage of the detection electrode (RX) is measured, whereby the touch position is detected.

The touch panel is provided on the front surface of the liquid crystal display panel. Accordingly, in order for a user to view the image which is displayed on the liquid crystal display panel, it is necessary to transmit the display image through the touch panel. Hence, it is preferable that the touch panel have a high optical transmittance.

The liquid crystal display panel includes, as shown in FIG. 1: a first substrate (SUB1; hereinafter referred to as a TFT substrate); a second substrate (SUB2; hereinafter referred to as a CF substrate); and a liquid crystal (not shown in the drawing) that is sandwiched between the TFT substrate (SUB1) and the CF substrate (SUB2).

Further, the TFT substrate (SUB1) has a larger area than the CF substrate (SUB2). Thus, in the region in which the TFT substrate (SUB1) is not opposed to the CF substrate (SUB2), a liquid crystal driver IC (DRV) is mounted. Furthermore, in the peripheral portion of one side of the corresponding region, a main flexible wiring substrate (MFPC) is mounted.

In addition, in FIG. 1, the reference sign "CT" represents a counter electrode (also referred to as a common electrode), "TFPC" represents a flexible wiring substrate for touch panel, "CD" represents aback-side transparent conductive film, "52" represents a connection member, and "53" represents a flexible wiring substrate for connection.

In the IPS liquid crystal display panel, contrary to the TN liquid crystal display panel or the VA liquid crystal display panel, there is no counter electrode (CT) on the substrate on which the color filters are provided. Hence, it is necessary to reduce display noise. For this reason, a back-side transparent conductive film (CD) formed of a transparent conductive film such as ITO is formed on the substrate on which the color filters are provided.

Figure 4:
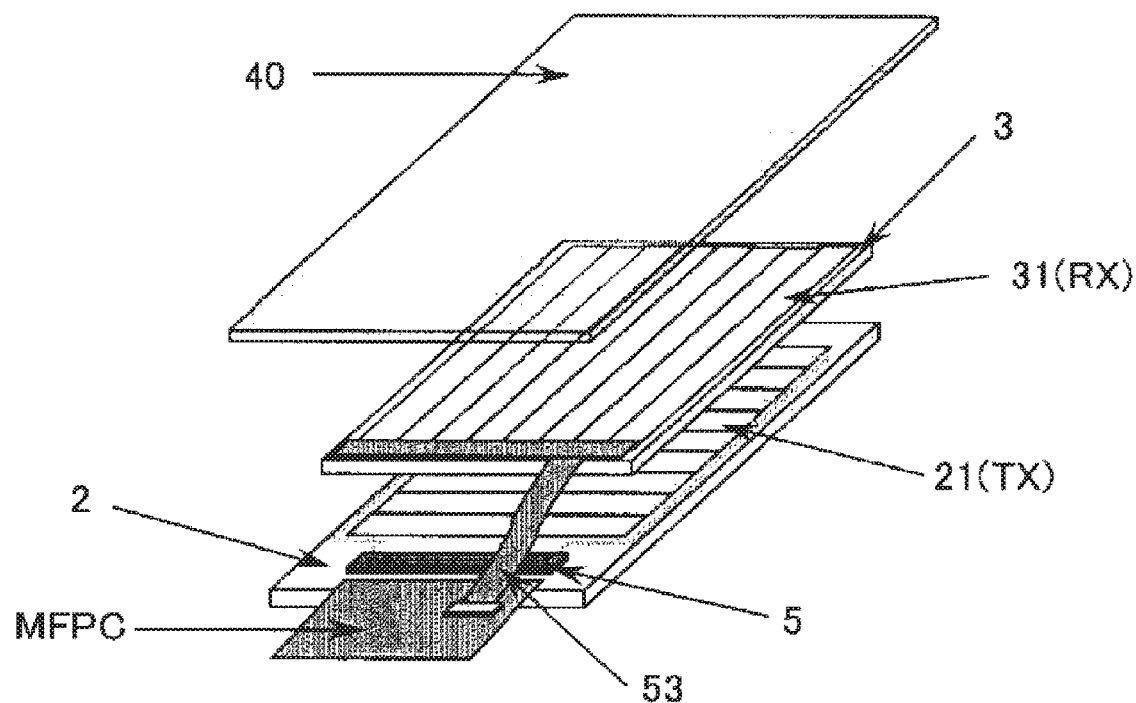
FIG. 4 is an exploded perspective view illustrating a schematic configuration of a touch-panel-built-in liquid crystal display device.

FIG. 4 is an exploded perspective view illustrating a schematic configuration of a touch-panel-built-in liquid crystal display device having a touch panel which is built in the liquid crystal display panel.

In FIG. 4, the reference sign "2" represents the TFT substrate, "3" represents the CF substrate, "21" represents the counter electrode (also referred to as a common electrode), "5" represents the liquid crystal driver IC, "MFPC" represents the main flexible wiring substrate, "40" represents a front window, and "53" represents the flexible wiring substrate for connection.

In the liquid crystal display device shown in FIG. 4, the back-side transparent conductive film (CD) on the CF substrate 3 is divided to have a band-like pattern, and the detection electrodes (RX) 31 of the touch panel are formed by the divided back-side transparent conductive film. The counter electrode 21 formed inside the TFT substrate 2 is divided to have a band-like pattern, that is, divided into a plurality of blocks, and also serves as scanning electrodes (TX) of the touch panel. Because the detection electrodes (RX) and the scanning electrodes (TX) are formed in this manner, the touch panel substrate (41 of FIG. 1) is removed from the liquid crystal display device shown in FIG. 4. Hence, in the liquid crystal display device shown in FIG. 4, the function of the touch panel control IC (DRT) shown in FIG. 1 is provided in the liquid crystal driver IC5.

Next, referring to FIG. 5, the counter electrodes 21 and the detection electrodes 31 of the liquid crystal display device shown in FIG. 4 will be described.

As described above, the counter electrodes 21 are provided on the TFT substrate 2. Plural (for example, about 20) counter electrodes 21 are connected at both ends thereof in common, and are connected to a counter electrode signal line 22.

Figure 5:
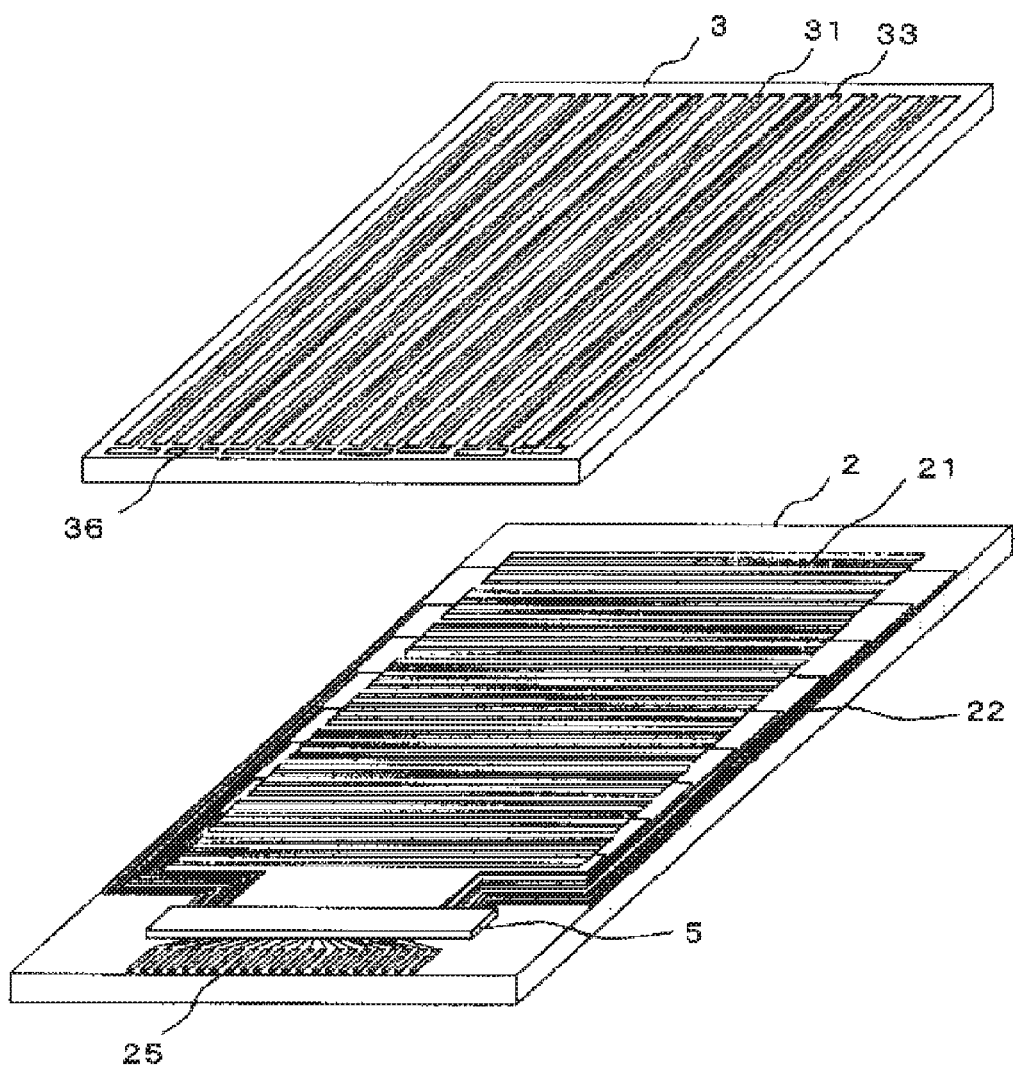
FIG. 5 is a diagram illustrating a counter electrode and detection electrodes in the touch-panel-built-in liquid crystal display device shown in FIG. 4.

In the liquid crystal display device shown in FIG. 5, the bundle-like counter electrodes 21 also function as the scanning electrodes (TX). Accordingly, the counter electrode signal includes a counter voltage used in the image display and a touch panel scanning voltage used in detecting the touch position.

The detection electrodes 31 are disposed with a certain space relative to the counter electrodes 21, and a capacitance is formed between each detection electrode 31 and each counter electrode 21. Accordingly, when the touch panel scanning voltage is applied to the counter electrode 21, a detection signal is generated in the detection electrode 31. The detection signal is extracted to the outside through a terminal 36 for detection electrode.

In addition, dummy electrodes 33 are formed on both sides of each detection electrode 31. The detection electrodes 31 extend at one end, and form a detection electrode terminal 36 having a T shape. Further, not only the counter electrode signal line 22 but also various lines and terminals such as a driving circuit input terminal 25 and the like are formed on the TFT substrate 2.

Figure 6:
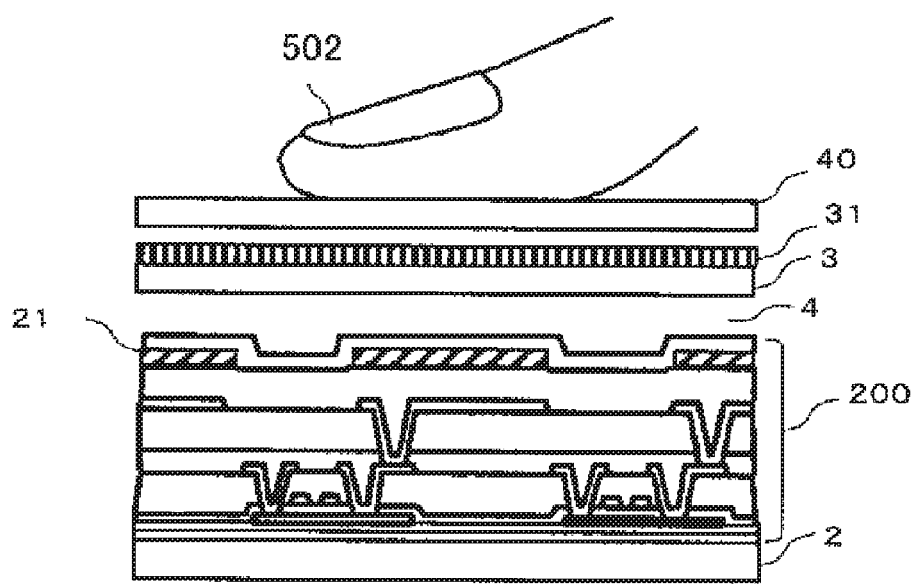
FIG. 6 is a schematic cross-sectional view illustrating, in an enlarged manner, a part of the cross section of a display section in the touch-panel-built-in liquid crystal display device shown in FIG. 4.

FIG. 6 is a schematic cross-sectional view illustrating, in an enlarged manner, a part of the cross section of a display section in the liquid crystal display device shown in FIG. 4.

As shown in FIG. 6, a pixel section 200 is provided on the TFT substrate 2, and each counter electrode 21 is used in the image display as a part of a pixel. Further, a liquid crystal composition 4 is sandwiched between the TFT substrate 2 and the CF substrate 3. As described above, a capacitance is formed between each detection electrode 31 provided on the CF substrate 3 and each counter electrode 21 provided on the TFT substrate. Thus, when a driving signal is applied to the counter electrode 21, the voltage of the detection electrode 31 is changed.

At this time, as shown in FIG. 6, if an electric conductor such as a finger 502 approaches or touches the front window 40, the capacitances change and the voltages generated in the detection electrodes 31 are changed compared to the case where there is no approach or touch.

As described above, by detecting the changes in the capacitances generated between the counter electrodes 21 and the detection electrodes 31 formed on the liquid crystal display panel, a function of the touch panel is provided in the liquid crystal display panel.

Figure 7:
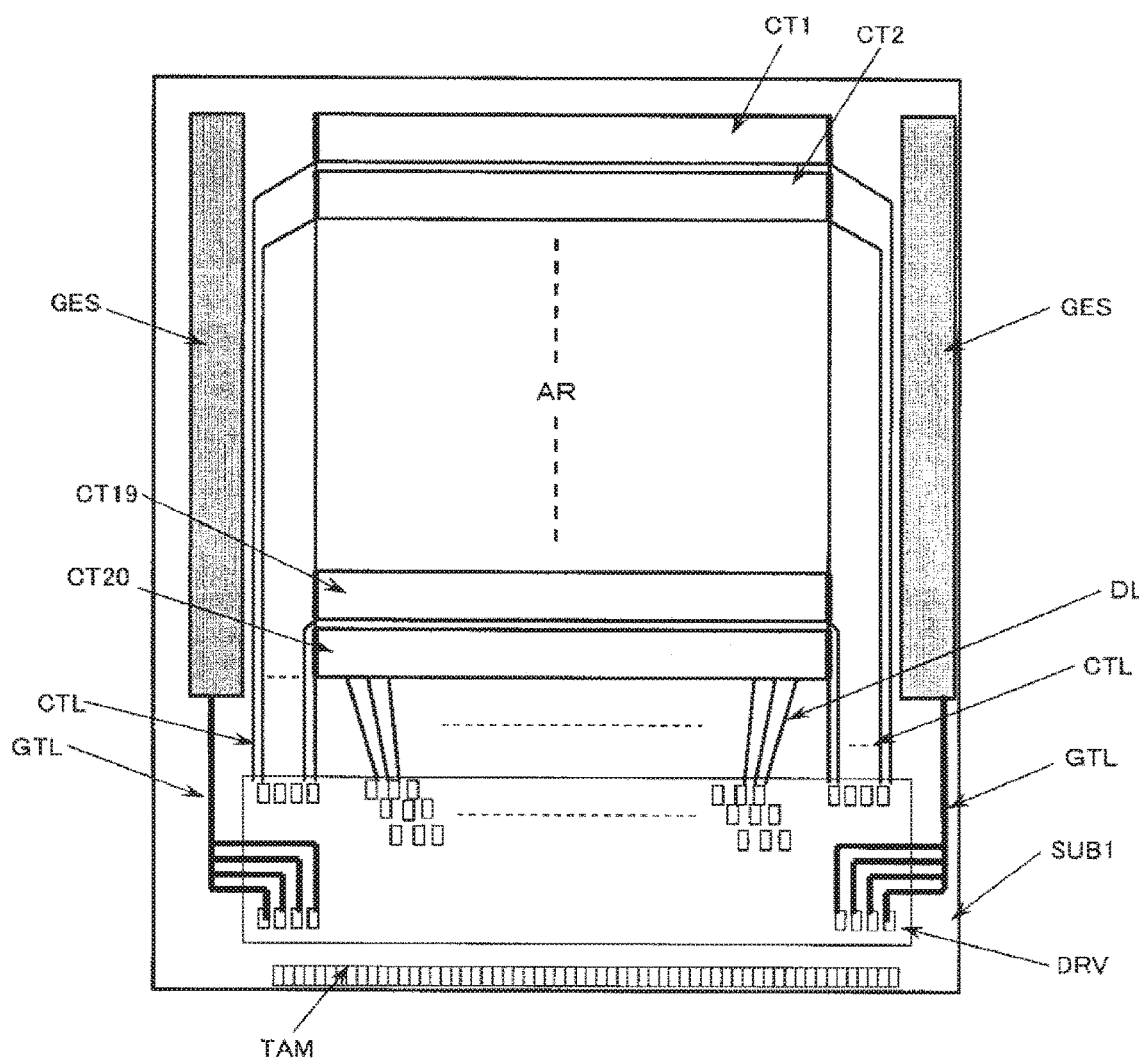
FIG. 7 is a top plan view illustrating an example of the counter electrode divided into a plurality of blocks in the liquid crystal display device according to an example of the invention.

FIG. 7 is a top plan view illustrating an example of the counter electrode divided into a plurality of blocks in the liquid crystal display device according to an example of the invention. In FIG. 7, the reference sign "SUB1" represents the TFT substrate, "DRV" represents the liquid crystal driver IC, "CT1" to "CT20" represent the counter electrodes of the blocks divided to have the band-like pattern, "DL" represents the video line, "CTL" represents a counter electrode line, "GES" represents a scanning line driving circuit which is built in the liquid crystal display panel, "GTL" represents a signal line for scanning line driving circuit, "TAM" represents a terminal portion which is connected to the main flexible wiring substrate (MFPC), and "AR" represents a display section formed of a plurality of pixels arranged in matrix.

The example shown in FIG. 7 employs a driving circuit, which has a circuit configuration using an a-Si single channel as the scanning line driving circuit (GES), or a driving circuit which has a circuit configuration using a poly-Si single channel of which a semiconductor layer is formed of an n-type polysilicon layer.

In the electrostatic capacitance type touch panel, in order to detect the change in the electrostatic capacitance caused by a finger or the like, it is preferable that the width of the scanning electrode (TX) for the touch panel performing the AC driving be about 4 to 5 mm. Hence, as the size of the liquid crystal display panel increases, the number of scanning electrodes (TX) increases.

In the example shown in FIG. 7, the counter electrodes (CT) of 1280 display lines are divided into 20 blocks (single block is formed of the counter electrode of 64 display lines) formed of CT1 to CT20, and it is necessary for 20 counter electrode lines (CTL) to be provided on each of the left and right sides.

The counter electrodes (CT1 to CT20) of the respective blocks deteriorate image quality when voltages are changed by parasitic capacitances in the display operation. Hence, it is necessary to decrease the resistance values of the counter electrode lines (CTL) which connect the liquid crystal driver IC (DRV) to the counter electrodes (CT1 to CT20) of the respective blocks.

Further, since there are lines on the scanning line driving circuit (GES), the counter electrode lines (CTL) are not mounted on the scanning line driving circuit (GES). Hence, the counter electrode lines (CTL) are disposed to be closer to the counter electrodes (CT) than the scanning line driving circuits (GES).

Figure 8:
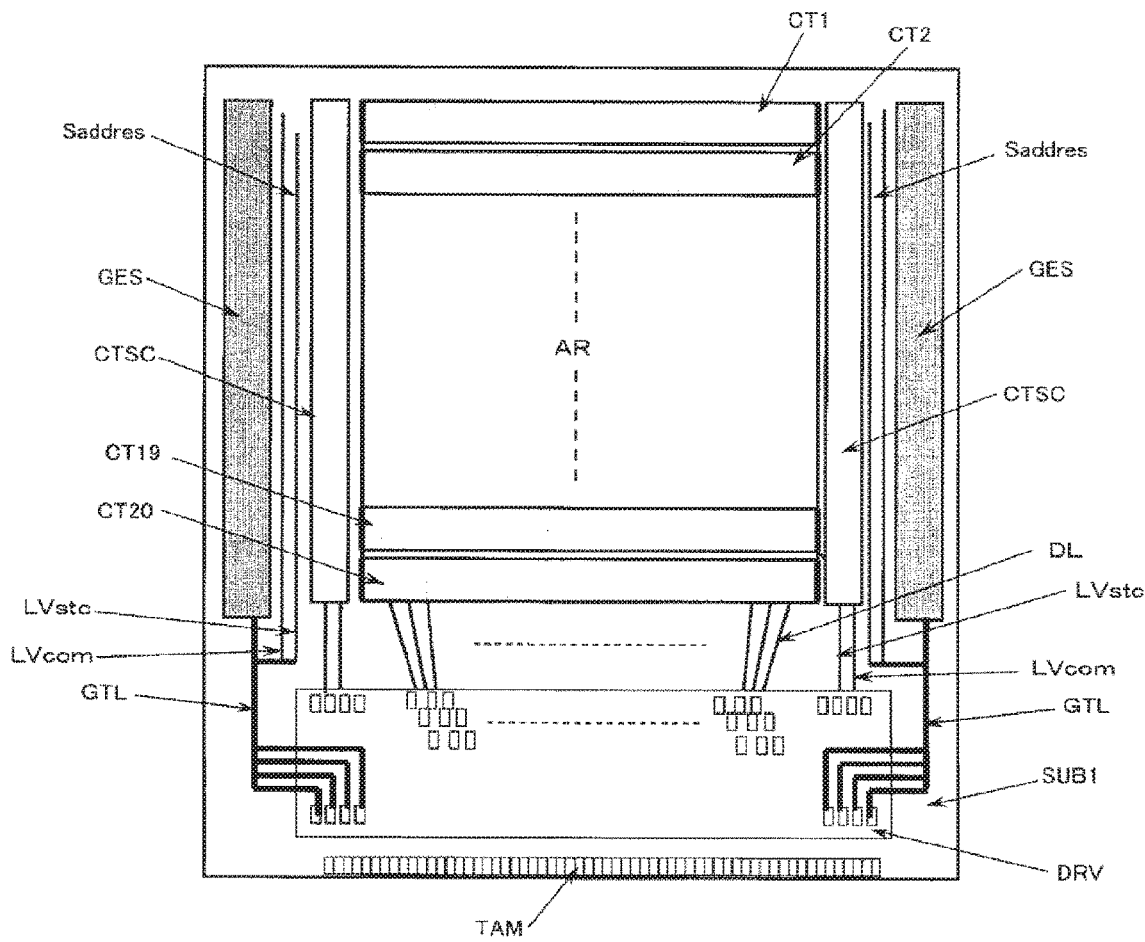
FIG. 8 is a top plan view illustrating a method of driving the counter electrode divided into the plurality of blocks in the liquid crystal display device according to another example of the invention.

FIG. 8 is a top plan view illustrating a method of driving the counter electrode divided into the plurality of blocks in the liquid crystal display device according to another example of the invention.

The liquid crystal display device shown in FIG. 8 is different from the liquid crystal display device shown in FIG. 7 in that the counter electrode selection circuits (CTSC), which select the respective counter electrodes (CT1 to CT20) divided into 20 blocks through an address decoding method, are built in the liquid crystal display panel.

In FIG. 8, a driving circuit having a CMOS circuit configuration is used as the counter electrode selection circuit (CTSC).

By adopting the address decoding method as the method of selecting the counter electrodes (CT1 to CT20) divided into the 20 blocks, the lines, for which low resistances are necessary, are two lines of a line (LVcom) of a counter voltage (Vcom), which is supplied to the counter electrodes (CT1 to CT20), and a line (LVstc) of a touch panel scanning voltage (Vstc).

In the example, the touch panel scanning voltage (Vstc) is supplied as a DC voltage which is higher by 5 to 10V than the counter voltage (Vcom). The counter electrode selection circuit (CTSC) selects a scanning location on the basis of the address signal (addres) which is supplied through an address signal line (Saddres), switches the counter voltage (Vcom) and the touch panel scanning voltage (Vstc) in response to the touch panel scanning signal (STC), and outputs the counter voltage (Vcom) or the touch panel scanning voltage (Vstc) to the counter electrode (CT) of the elected block which also serves as the scanning electrode (TX).

In the liquid crystal display device shown in FIG. 8, even when the number of divisions of the counter electrode (CT) increases, only the number of the address signal lines (Saddres) increases. Therefore, in a state where the left and right frames of the liquid crystal display panel are prevented from being increased, it is possible to increase the number of divisions of the counter electrode used as the touch panel scanning electrodes.

Figure 9:
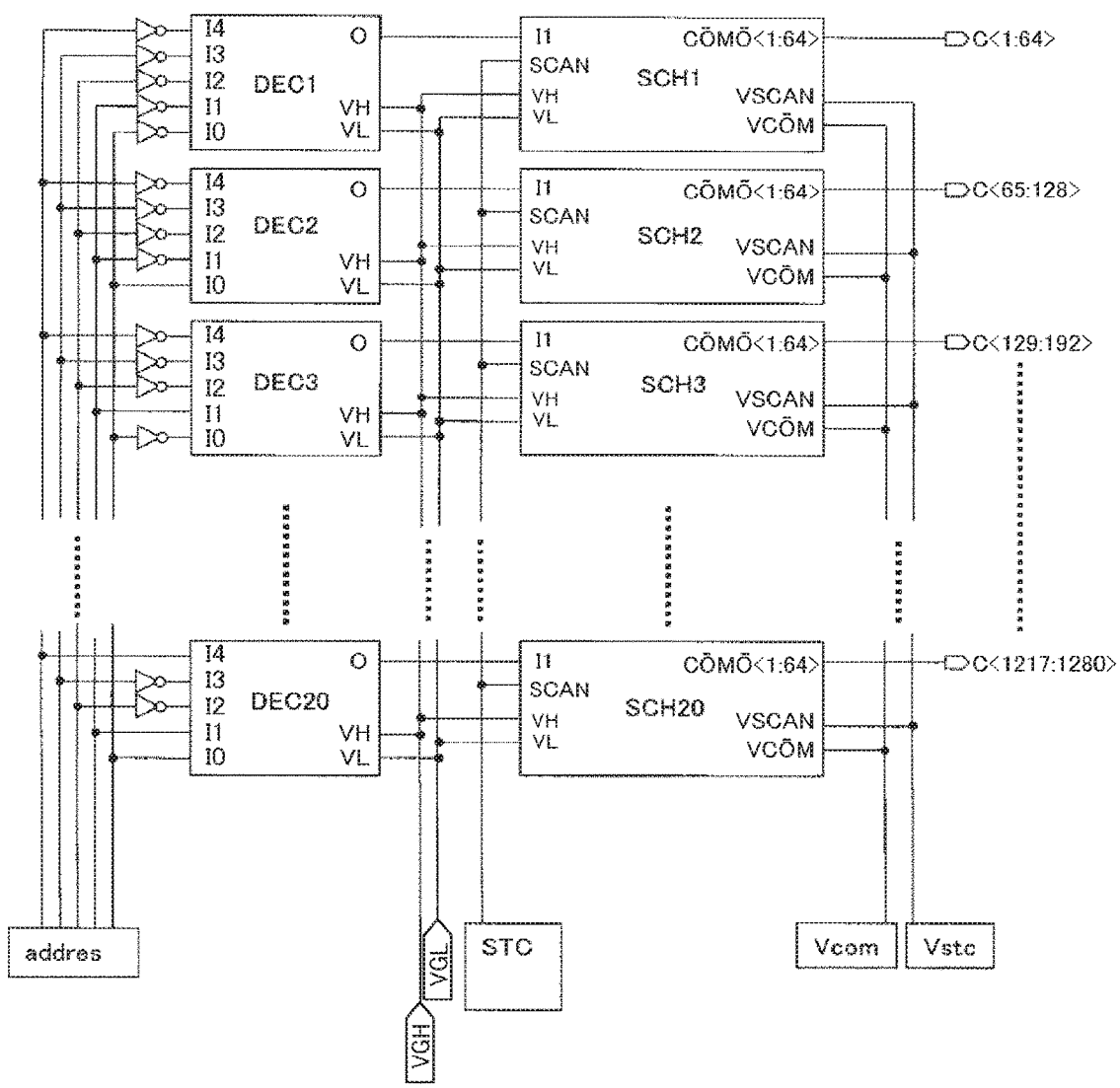
FIG. 9 is a block diagram illustrating an exemplary configuration of the counter electrode selection circuit shown in FIG. 8.

FIG. 9 is a block diagram illustrating an exemplary configuration of the counter electrode selection circuit (CTSC) shown in FIG. 8.

As shown in FIG. 9, the counter electrode selection circuit (CTSC) includes address decoder circuits (DEC1 to DEC20) and selection circuits (SCH1 to SCH20).

In the liquid crystal display device shown in FIG. 8, a single block is formed by electrically connecting the counter electrodes (CT), each corresponding to the 64 display lines, to one another in the liquid crystal display panel such that the pitch of the scanning electrodes (TX) of the touch panel is 5 mm, whereby the 1280 display lines are divided into 20. Then, the counter electrodes (CT1 to CT20) of the 20 blocks correspond one-to-one with the address decoder circuits (DEC1 to DEC20). Since the number of divisions is 20 blocks, the address is 5 bits, and 5 address signal lines (Sadd) are necessary.

The counter electrode of the single block selected by the address signal (addres), that is, the counter electrode (CT) corresponding to the 64 display lines is AC-driven on the basis of the touch panel scanning signal (STC), and the counter voltage is applied to the other counter electrodes (CT).

Figure 10:
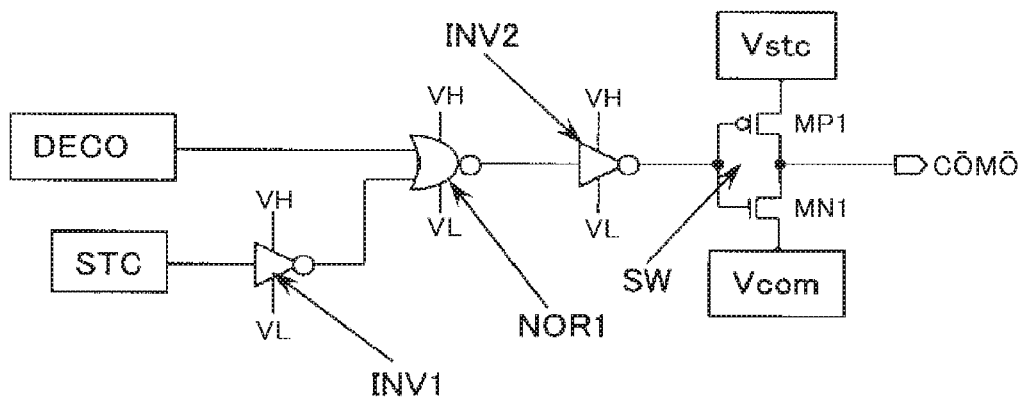
FIG. 10 is a circuit diagram illustrating an exemplary circuit configuration of selection circuits shown in FIG. 9.

FIG. 10 is a circuit diagram illustrating an exemplary circuit configuration of selection circuits (SCH1 to SCH20) shown in FIG. 9.

In the selection circuit shown in FIG. 10, the output (DECO) of the address decoder circuit (DEC1 to DEC20) and the inverted signal of the touch panel scanning signal (STC), which is inverted by an inverter (INV1), are input to a NOR circuit (NOR1). The selection circuit causes the inverter (INV2) to invert the output of the corresponding NOR circuit (NOR1) and inputs the output to a switching circuit (SW), thereby selecting the touch panel scanning voltage (Vstc) or the counter voltage (Vcom) and outputting the voltage to the counter electrodes (CT1 to CT20) of the respective blocks.

Thereby, when one of the address decoder circuits (DEC1 to DEC20) is selected, the touch panel scanning voltage (Vstc) and the counter voltage (Vcom) are switched in response to the touch panel scanning signal (STC), and the voltage is output to the counter electrode of each block.

That is, in the selection circuit shown in FIG. 8, when the output (DECO) of the address decoder circuit (DEC1 to DEC20) is at the Low level (hereinafter referred to as the L level) and the touch panel scanning signal (STC) is at the High level (hereinafter referred to as the H level), the output of the NOR circuit (NOR1) is at the H level, and therefore the switching circuit (SW) selects the touch panel scanning voltage (Vstc). In contrast, when the touch panel scanning signal (STC) is at the L level or the output (DECO) of the address decoder circuit (DEC1 to DEC20) is at the H level, the output of the NOR circuit (NOR1) is at the L level, and therefore the switching circuit (SW) selects the counter voltage (Vcom).

Figure 11:
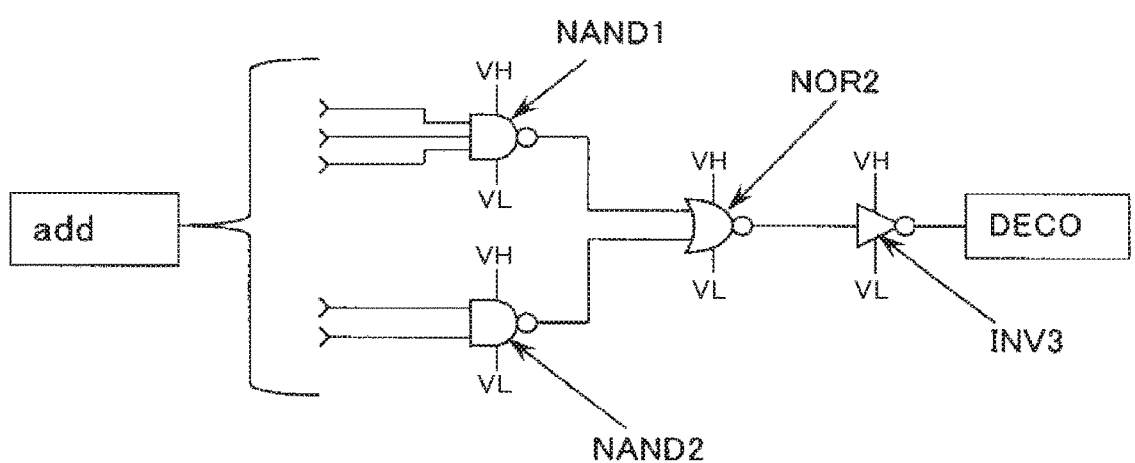
FIG. 11 is a circuit diagram illustrating an exemplary circuit configuration of the address decoder circuit shown in FIG. 9.

FIG. 11 is a circuit diagram illustrating an exemplary circuit configuration of the address decoder circuit (DEC1 to DEC20) shown in FIG. 9.

As shown in FIG. 11, in the address decoder circuit (DEC1 to DEC20), the address signal as it is or the inverted signal, which is generated by inverting the address signal through the inverter (INV), is input to each of the 5 address signals (addres), and decoding is performed on the basis of the combination of the H and L levels of the 5 address signals (addres).

In the address decoder circuit shown in FIG. 11, the address signal (add), which is a predetermined combination of the 5 address signals (addres), is input to NAND circuits (NAND1, NAND2), and the outputs of the corresponding NAND circuits (NAND1, NAND2) are input to a NOR circuit (NOR2). Then, the output of the corresponding NOR circuit (NOR2) is inverted by the inverter (INV3), and becomes the output (DECO) of the address decoder circuit. Accordingly, the address decoder circuit shown in FIG. 11 outputs the voltage with the L level as the output (DECO) when the combination of the address signals coincides with the combination of the address signals set by the address decoder circuit itself, and outputs the voltage with the H level as the output (DECO) when the combination of the address signals does not coincide with the combination of the address signals set by the address decoder circuit itself.

Figure 12:
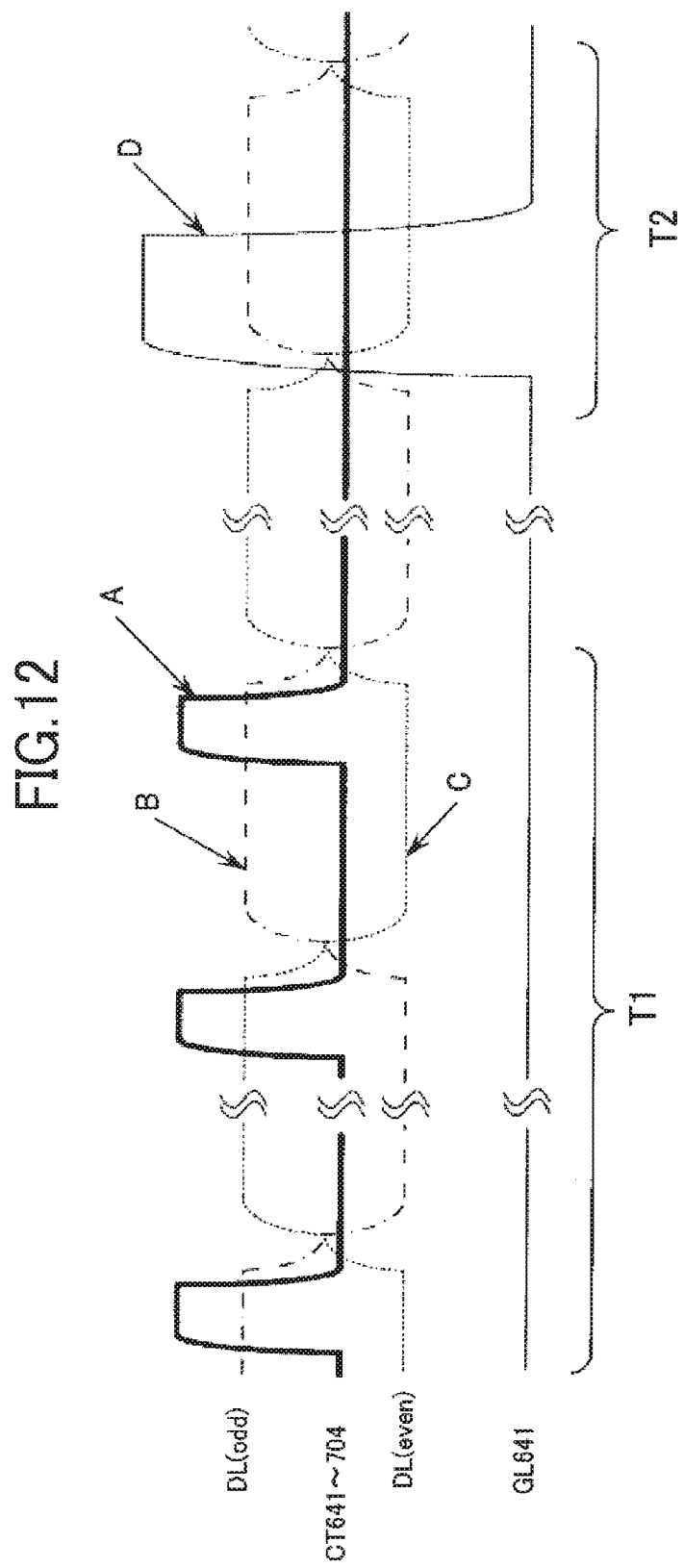
FIG. 12 is a diagram illustrating a driving waveform at the time of pixel writing and at the time of touch panel detection in the touch-panel-built-in liquid crystal display device.

FIG. 12 is a diagram illustrating a driving waveform at the time of pixel writing and at the time of touch position detection on the touch panel in the touch-panel-built-in liquid crystal display device.

In FIG. 12, the signal waveform A indicates a pulse waveform of the touch panel scanning voltage (Vstc) which appears in the output voltage of the selection circuit (SCH11) supplied to the counter electrode (CT11) of the 641 to 704 display lines of the 11th block among the counter electrodes divided into the 20 blocks. Further, the signal waveform B indicates a waveform of a video voltage supplied to the video lines (DL) of the odd columns. The signal waveform C indicates a waveform of a video voltage supplied to the video lines (DL) of the even columns. The signal waveform D indicates a pulse waveform of the gate signal (selection scanning voltage) which is supplied to the gate electrode of the thin film transistor at the 641st display line through the 641st scanning line (GL). Furthermore, the time period T1 indicates a touch position detection time period, and the time period T2 indicates a pixel writing time period.

The touch position detection time period (T1) is set as a time period other than the pixel writing time period (T2) in order to prevent the effect to the display. Further, in the touch position detection time period (T1), in order to increase the detection sensitivity, scanning is performed plural times by the scanning electrode (TX) at the same location. Specifically, in FIG. 12, the counter electrode (CT11) of the 11th block is supplied with the touch panel scanning voltage (Vstc) plural times. Further, in the pixel writing time period (T2), the counter electrode (CT11) of the 11th block is not supplied with the touch panel scanning voltage (Vstc), but supplied with the counter voltage (Vcom).

Figure 13:
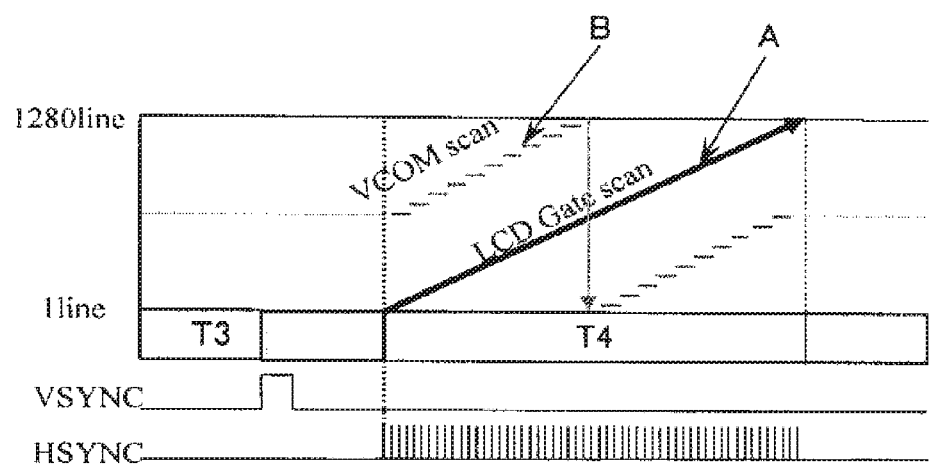
FIG. 13 is a diagram illustrating the timing of the pixel writing and the timing of the touch panel detection in the touch-panel-built-in liquid crystal display device.

FIG. 13 is a diagram illustrating the timing of the pixel writing and the timing of the touch position detection on the touch panel in the touch-panel-built-in liquid crystal display device.

In FIG. 13, the reference sign "A" indicates the timing of pixel writing from the 1st display line to the 1280th display line in the pixel writing time period (T4) of the single frame, and the reference sign "B" indicates the timing of detecting the touch position on the touch panel in the counter electrodes (CT1 to CT20) of the respective blocks divided into the 20 blocks.

As shown in FIG. 13, by causing the counter electrode of an arbitrary display line to function as the scanning electrode (TX), the scanning operation at the time of touch position detection is performed at a location different from that of the gate scanning which performs pixel writing. It should be noted that, in FIG. 13, the reference sign "T3" represents a flyback period, "VSYNC" represents a vertical synchronization signal, and "HSYNC" represents a horizontal synchronization signal.

Figure 14:
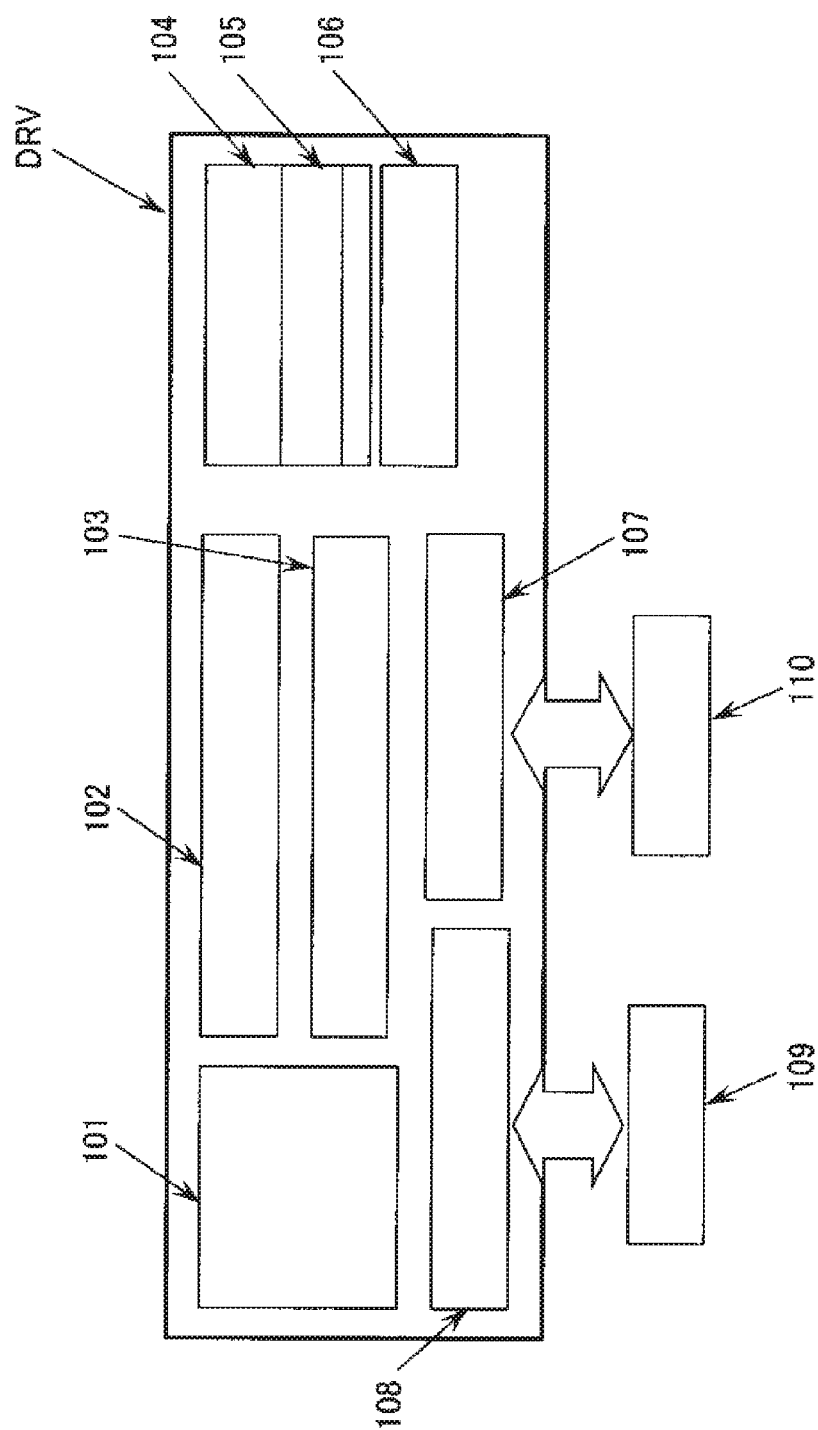
FIG. 14 is a diagram illustrating a circuit configuration of a liquid crystal driver IC according to an example of the invention.

FIG. 14 is a diagram illustrating a circuit configuration of the liquid crystal driver IC (DRV) according to an example of the invention.

As shown in FIG. 14, in the liquid crystal driver IC (DRV) according to the example, various circuits for driving the liquid crystal display panel are mounted on the same semiconductor chip. Specifically, the liquid crystal driver IC has the following built-in components: a control circuit 101 for the scanning line driving circuit (GES); a source amplifier circuit 102; a gradation voltage generation circuit 103; a VGH/VGL generation circuit 108; a VSP/VSN generation circuit 107; a TX control circuit 104; a common amplifier circuit 105; and a RX detection circuit 106. The liquid crystal driver IC5 and the scanning line driving circuit (GES) constitute a driving circuit for both of a liquid crystal display function and a touch panel function in the liquid crystal display panel. It should be noted that the TX control circuit 104 is a circuit, which is hitherto mounted on the exclusive semiconductor chip, for the touch panel control function. Further, in FIG. 14, the reference numbers "109" and "110" represent external components.

Then, in order to optimize the circuit size of the semiconductor chip, the power supply of the TX control circuit 104, the common amplifier circuit 105, and the RX detection circuit 106 is configured such that the voltages of various voltage generation circuits for driving the liquid crystal display panel are shared.

Figure 15A:
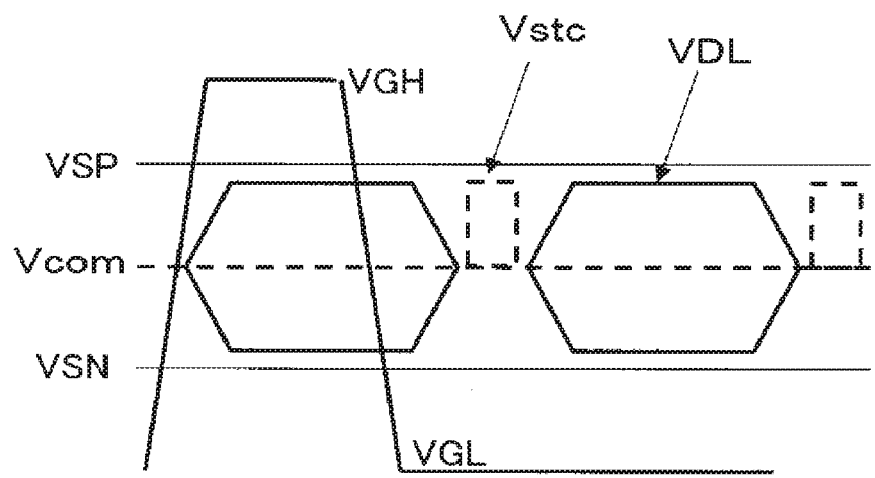
FIG. 15A is a diagram illustrating main liquid crystal driving voltages at the time of normal display of the liquid crystal display device according to the example of the invention.
Figure 15B:
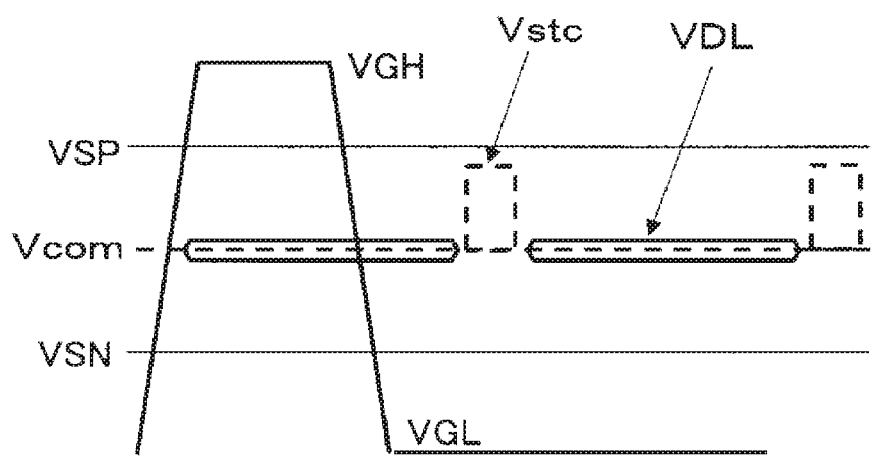
FIG. 15B is a diagram illustrating main liquid crystal driving voltages at the time of "black" display of the liquid crystal display device according to the example of the invention.

FIGS. 15A and 15B show voltage signals used in driving the liquid crystal in the liquid crystal display device according to the example. FIG. 15A shows liquid crystal driving voltages at the time of normal display. FIG. 15B shows liquid crystal driving voltages at the time of "black" display.

In FIGS. 15A and 15B, VGH is a voltage which is supplied to the scanning line of the liquid crystal display panel in order to turn on the thin film transistors (TFT) of pixels, and VGL is a voltage which is supplied to the scanning line of the liquid crystal display panel in order to turn off the thin film transistors (TFT) of pixels.

VDL is a video voltage which is output from the source amplifier circuit 102 and is supplied to the video line (DL) of the liquid crystal display panel.

Vcom is a counter voltage which is supplied to the counter electrodes (CT). In the liquid crystal display device according to the example, the dot inversion driving method and the column inversion driving method are adopted as the AC driving method. Hence, the counter voltage (Vcom), which is supplied to the counter electrodes (CT), is a constant voltage in the time period other than that of the scanning operation at the time of touch position detection.

Vstc is a touch panel scanning voltage which is supplied to the selected counter electrodes (CT) in the time period of the scanning operation at the time of touch position detection.

VSP and VSN are power supply voltages of the source amplifier circuit 102, and are voltages necessary for generating the output voltage of the source amplifier circuit 102.

As described above, in the scanning operation at the time of touch position detection on the touch panel, the counter electrodes (CT) function as the scanning electrodes (TX) at a location different from that of the gate scanning for performing pixel writing, and the touch panel scanning voltage (Vstc) is supplied to the counter electrodes (CT).

Then, by detecting the changes in the detection voltage detected through the detection electrodes (RX) in the RX detection circuit 106 in synchronization with the timing of the scanning operation, the touch panel function is implemented.

The liquid crystal driving voltages at the time of "black" display shown in FIG. 15B are the same as the voltages in FIG. 15A other than the video voltage (VDL) which is output from the source amplifier circuit 102. However, the voltage difference between the common voltage (Vcom) and the video voltage at the time of "black" display is minimized.

Figure 16:
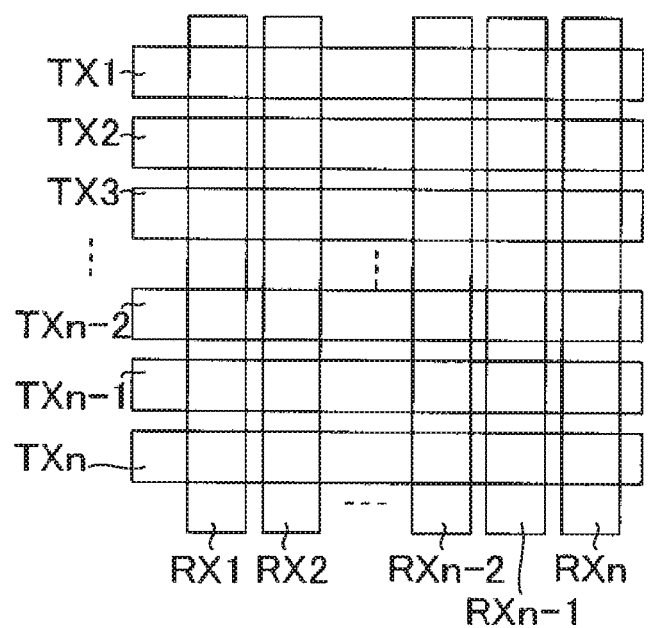
FIG. 16 is a diagram illustrating an electrode shape of the touch panel of the liquid crystal display device according to the example of the invention.

FIG. 16 is a diagram illustrating an electrode shape of the touch panel of the liquid crystal display device according to the example.

The scanning electrodes (TXn) of FIG. 16 correspond to the divided counter electrodes (CT1 to CT20) shown in FIGS. 7 and 8, and the detection electrodes (RXn) correspond to the detection electrodes 31 shown in FIG. 4.

Figure 18:
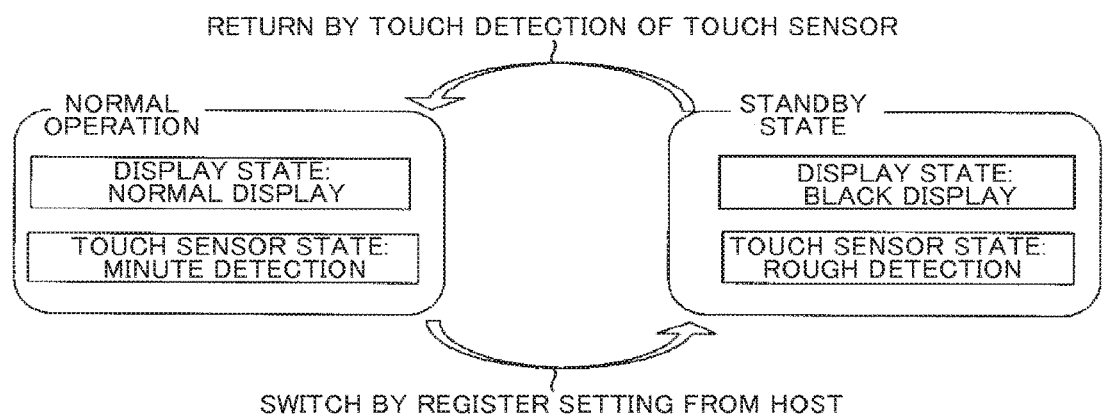
FIG. 18 is a system state transition diagram of the liquid crystal display device according to the example of the invention.

FIG. 18 is a system state transition diagram of the liquid crystal display device according to the example.

At the time of the normal operation shown in FIG. 18, a normal image is displayed on the liquid crystal display panel, and the liquid crystal display panel is driven on the basis of the voltage relation shown in FIG. 15A.

Figure 17A:
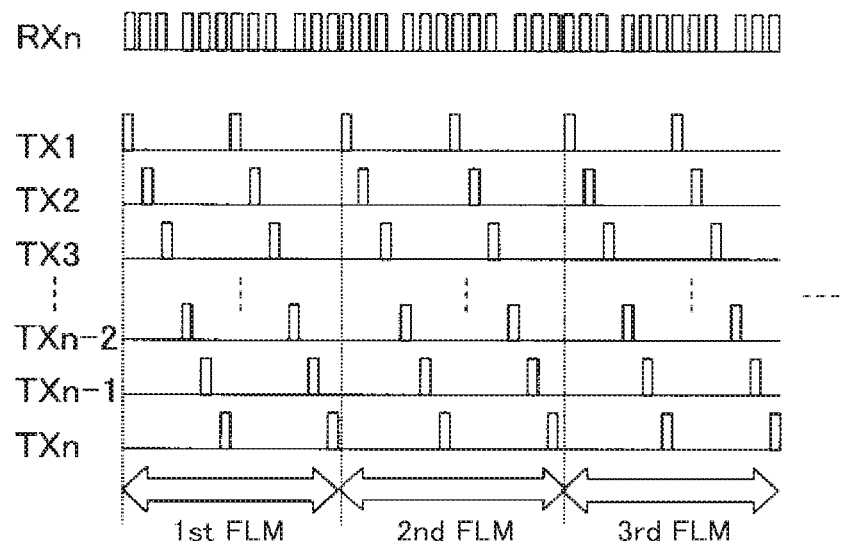
FIGS. 17A and 17B are diagrams illustrating touch panel scanning operations according to the example of the invention.

Further, at the time of the normal operation, as shown in FIG. 17A, the touch panel scanning voltage (Vstc) is output for each frame (FLM), whereby the scanning operation for detecting the touch position on the touch panel is performed. In such a manner, the touch panel function is operated all the time.

Figure 17B:
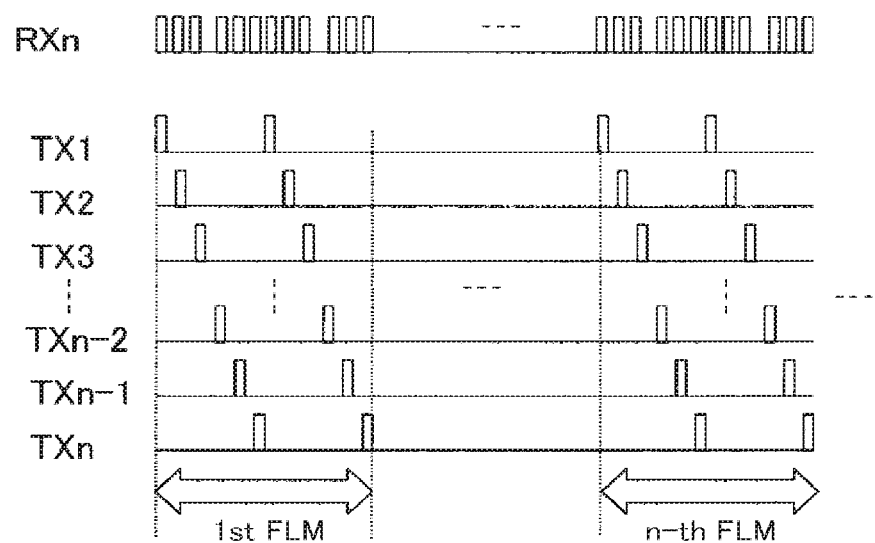

As shown in FIG. 18, in a standby state of register setting made from the host, the "black" image is displayed on the liquid crystal display panel. Further, in the standby state, as shown in FIG. 17B, the touch panel scanning voltage (Vstc) is not supplied for each frame, but is thinned out to be output to plural frames (FLM) once, whereby the scanning operation for detecting the touch position on the touch panel is performed. In such a manner, power consumption is reduced.

When the touch panel and the liquid crystal display panel are controlled by an individual semiconductor chip, the "black" display is non-display (not operated), and the electric power ideally reaches 0.

However, in the system configuration of the example, the voltage for the touch panel function and the driving voltage for display are generated as a common voltage. Hence, in order to operate the touch panel function even in the "black" display in the standby state, it is necessary to operate various voltage generation circuits for driving the liquid crystal display device.

Therefore, in the liquid crystal driver IC (DRV) of the example, power consumption of "black" display is reduced, and thus low power consumption is achieved by the combination of adjustment and stop of various voltage generation circuits to be described later.

Figure 19:
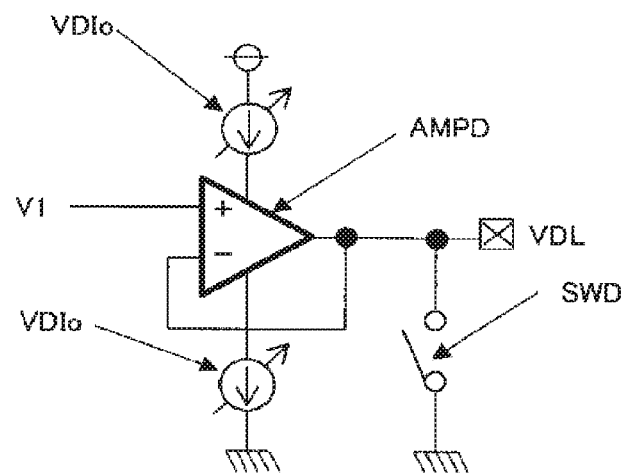
FIG. 19 is a diagram illustrating a circuit configuration of a source amplifier circuit according to the example of the invention.

FIG. 19 shows a circuit configuration of the source amplifier circuit 102 according to the example.

As shown in FIG. 19, in the source amplifier circuit 102 of the example, the amplifier circuit (voltage follower circuit; AMPD) is connected to a current adjustment circuit (VDIo) which has a function capable of adjusting current through the register setting. In the standby state, the source amplifier circuit 102 lowers current, which is output from the current adjustment circuit (VDIo), compared with the normal operation, and reduces the current which flows in the amplifier circuit (AMPD), thereby achieving low power consumption. Further, the current adjustment circuit (VDIo) may be deactivated. At the time of the inactivation, a ground voltage (GND) is output by a switching circuit (SWD).

Figure 20:
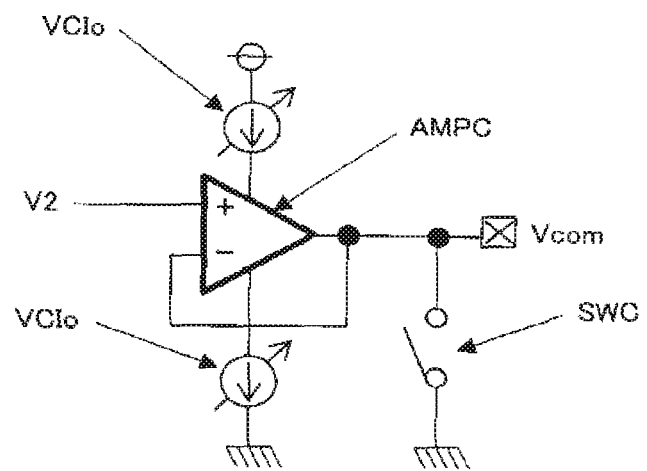
FIG. 20 is a diagram illustrating a circuit configuration of a common amplifier circuit according to the example of the invention.

FIG. 20 shows a circuit configuration of the common amplifier circuit 105 according to the example.

As shown in FIG. 20, in the common amplifier circuit 105 of the example, the amplifier circuit (voltage follower circuit; AMPC) is connected to a current adjustment circuit (VCIo) which has a function capable of adjusting current through the register setting. In the standby state, the common amplifier circuit 105 lowers current, which is output from the current adjustment circuit (VCIo), compared with the normal operation, and reduces the current which flows in the amplifier circuit (AMPC), thereby achieving low power consumption. Further, the current adjustment circuit (VCIo) may be deactivated. At the time of the inactivation, a ground voltage (GND) is output by a switching circuit (SWC).

Figure 21:
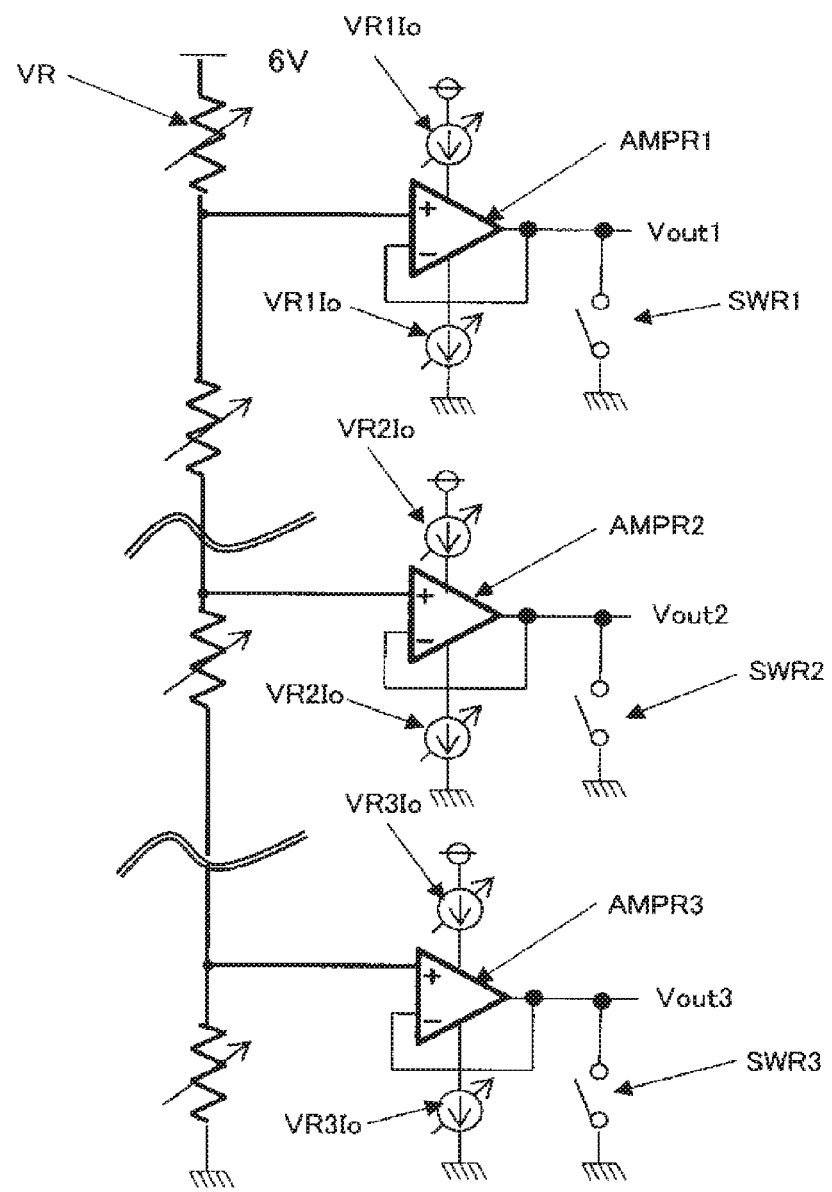
FIG. 21 is a diagram illustrating a circuit configuration of a gradation voltage generation circuit according to the example of the invention.

FIG. 21 shows a circuit configuration of the gradation voltage generation circuit 103 according to the example. It should be noted that FIG. 21 shows only the gradation voltage generation circuit which generates positive gradation voltages, but in practice, there is also provided a gradation voltage generation circuit which generates negative gradation voltages.

As shown in FIG. 21, the gradation voltage generation circuit 103 according to the example has gradation voltage generation resistances (VR) of which the resistance values are variable in the register setting, in which amplifier circuits (AMPR1 to AMPR3) are disposed at the output points of the gradation voltages (video voltages) applied to the liquid crystal in the gradation voltage generation resistances (VR).

The amplifier circuits (AMPR1 to AMPR3) are connected to the current adjustment circuits (VR1Io to VR3Io) each of which has a function capable of adjusting current through the register setting. In the standby state, the gradation voltage generation circuit 103 lowers current, which is output from each current adjustment circuit (VR1Io to VR3Io), compared with the normal operation, and reduces the current which flows in each amplifier circuit (AMPR1 to AMPR3), thereby achieving low power consumption. Further, each current adjustment circuit (VR1Io to VR3Io) may be deactivated. At the time of the inactivation, a ground voltage (GND) is output by each switching circuit (SWR1 to SWR3).

Figure 22:
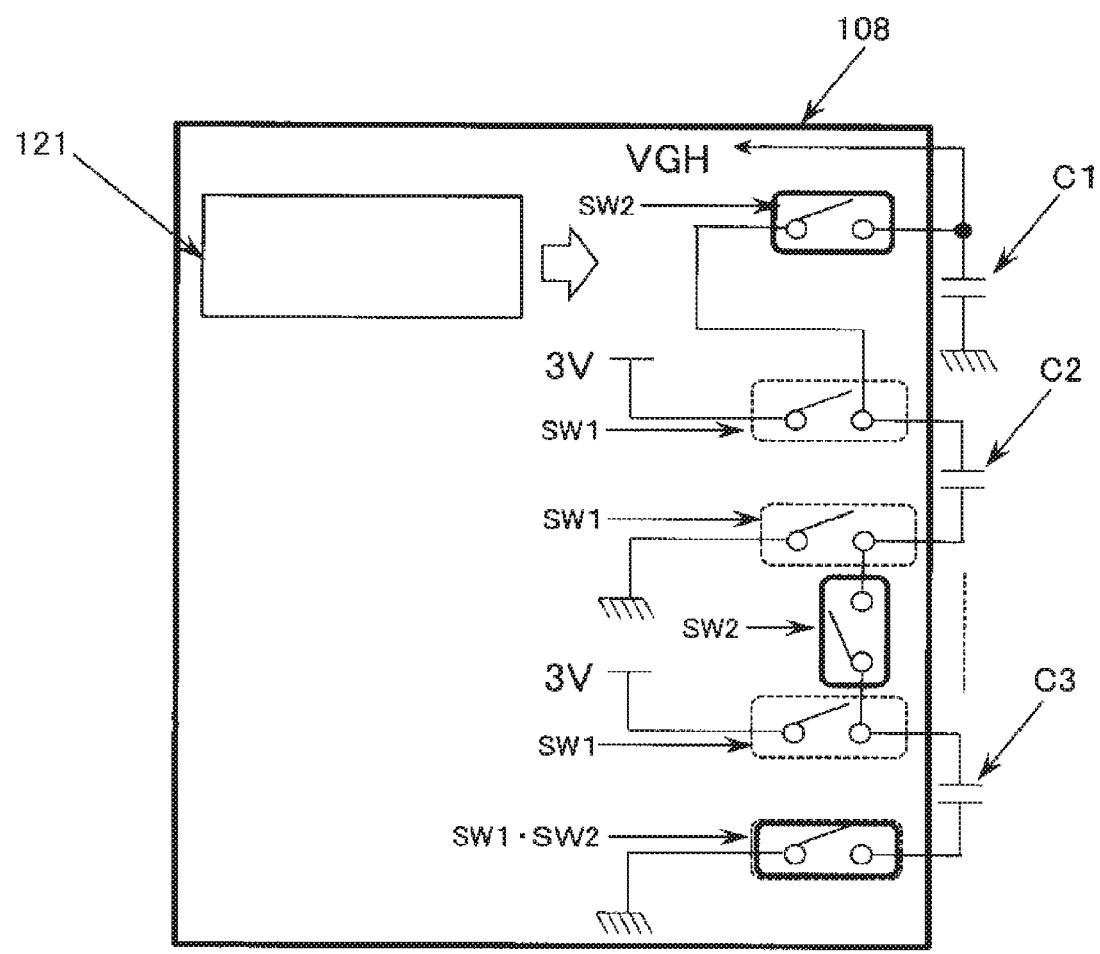
FIG. 22 is a diagram illustrating a circuit configuration of a VGH/VGL generation circuit according to the example of the invention.

FIG. 22 shows a circuit configuration of a VGH/VGL generation circuit 108 according to the example.

The VGH/VGL generation circuit 108 shown in FIG. 22 is a charge-pump-type step-up circuit using only capacitors (C1 to C3) as external circuits (external circuits 109 of FIG. 14). The VGH/VGL generation circuit 108 has a switching circuit (SW1) and a switching circuit (SW2) which switch connections of the plural capacitors (C1 to C3), and generates high voltages from the low voltage of about 3V which is input from the outside by alternately switching the switching circuit (SW1) and the switching circuit (SW2).

The circuit shown in FIG. 22 has a configuration for generating a certain 1-level voltage. When generating voltages with plural levels, plural circuits shown in FIG. 22 are provided.

The adjustment circuit 121 provided in the VGH/VGL generation circuit 108 is able to adjust switching periods of the switching circuit (SW1) and the switching circuit (SW2) in accordance with the register setting, whereby the VGH/VGL generation circuit 108 is able to adjust the current supply capability.

Figure 23:
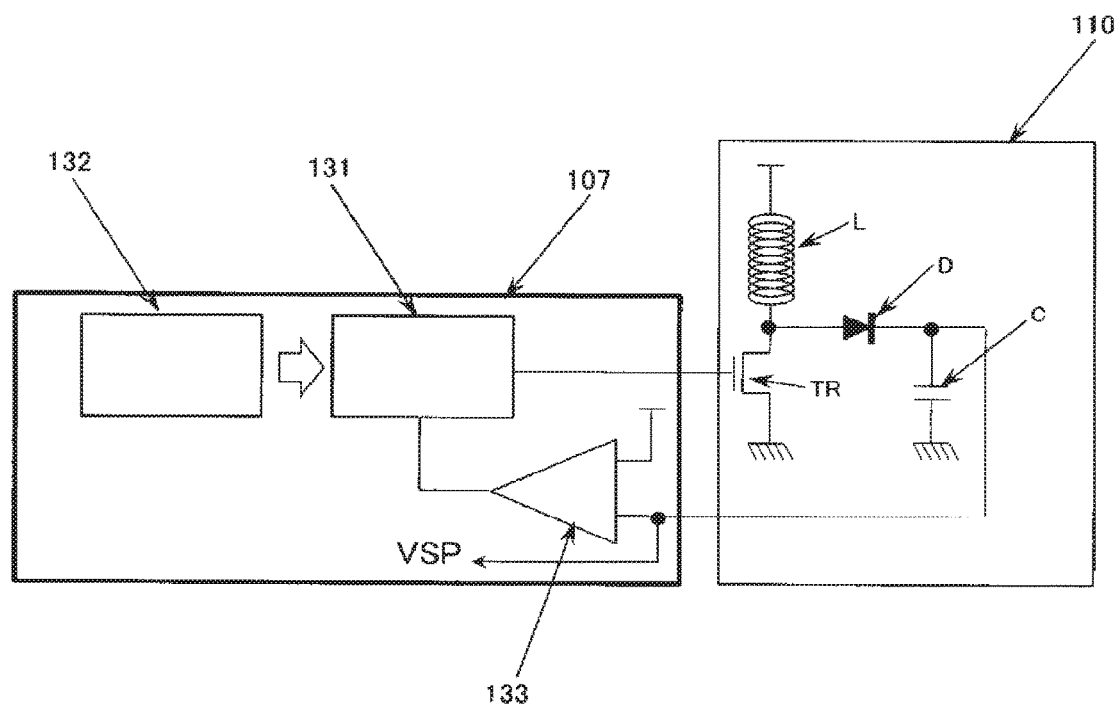
FIG. 23 is a diagram illustrating a circuit configuration of a VSP/VSN generation circuit according to the example of the invention.

FIG. 23 shows a circuit configuration of the VSP/VSN generation circuit 107 according to the example.

The circuit is a circuit used in the voltage generation circuit that generates about 6V which the current supply capability of the circuit configuration of FIG. 22 is not enough to supply.

In FIG. 23, in the example of the circuit configuration that generates only the VSP voltage, one set of the same circuit configuration is additionally necessary at the time of VSN voltage generation.

The external circuit 110 includes, as shown in FIG. 23, an inductor (L), a Schottky barrier diode (D), a capacitor (C), and a MOS transistor (TR). The gate on/off control of the MOS transistor (TR) is performed by the PWM generation circuit 131. The PWM generation circuit 131 fixes the frequency of the gate pulse, and controls the high width and the low width of the gate pulse. The VSP/VSN generation circuit 107 has a built-in period adjustment circuit 132 capable of adjusting the frequency of the gate pulse in accordance with the register setting.

In the circuit of FIG. 23, the energy of the inductor (L) generated by the switching of the MOS transistor (TR) is rectified by the Schottky barrier diode (D), whereby it is possible to obtain a constant voltage. The capacitor (C) holds the constant voltage, and uses the voltage, which is held in the capacitor, as a VSP voltage.

The voltage comparator circuit 133 compares the VSP voltage, which is held in the capacitor (C), with a reference voltage set as a target voltage, and the PWM generation circuit 131 keeps the VSP voltage constant by controlling the high width and the low width of the pulse in accordance with the comparison result.

FIG. 24 shows combinations of various kinds of adjustment circuit states for achieving lower power consumption in the standby state in the liquid crystal display device according to the example.

First, at the time of the normal operation shown in FIG. 18, the liquid crystal display device is driven by the dot inversion driving method or the like, and displays the normal image on the liquid crystal display panel. At that time, it is necessary for the liquid crystal display device to be driven by using the liquid crystal driving voltages shown in FIG. 15A. Hence, the current capabilities of various voltage generation circuits are optimized such that the electric power is minimized, but are set on the basis of a normal specification which is not extremely limited.

Meanwhile, the liquid crystal display device may be in the display off state, in which "black" is displayed on the liquid crystal display panel, as the standby state shown in FIG. 18. In this case, as shown in FIG. 15B, the video voltage (VDL), which is output from the source amplifier circuit 102, has no potential difference from the common voltage (Vcom), in which current is unlikely to be charged or discharged to the liquid crystal. Accordingly, the low power consumption is achieved in accordance with the situation.

First, in the low power consumption mode 1, the AC driving method of the liquid crystal panel is changed from the dot inversion driving method into a column inversion driving method (or an inversion driving method for each column), whereby the charged or discharged current is reduced to be applied once in a single frame in the liquid crystal.

At this time, only "black" is displayed on the liquid crystal display panel. Hence, in the gradation voltage generation circuit 103, it is enough to operate a minimum necessary number of amplifier circuits. Accordingly, only the amplifier circuits of approximately 6V and the GND voltage, that is, a top amplifier circuit (AMPR1), which is an amplifier circuit outputting the highest gradation voltage, and a bottom amplifier circuit (AMPR3), which is an amplifier circuit outputting the lowest gradation voltage, are operated, and the middle amplifier circuit, which is an amplifier circuit of the middle voltage other than those, is deactivated, thereby achieving low power consumption.

Next, the low power consumption mode 2 will be described. In the standby state, the charged or discharged current necessary for the source amplifier circuit 102 is small. Hence, it is possible to reduce the current capability of VSP/VSN as the power supply voltage of the source amplifier circuit 102. Accordingly, in the low power consumption mode 2, in addition to the above-mentioned setting made in the low power consumption mode 1, the pulse period of the PWM generation circuit 131 of the VSP/VSN generation circuit 107 is set to be increased by the period adjustment circuit 132, and the current capability is set to be low, thereby achieving low power consumption.

Further, in addition to this, the amounts of currents in the source amplifier circuit 102 and only the two active amplifier circuits (AMPR1, AMPR3) of the gradation voltage generation circuit 103 are adjusted to be minimized, thereby achieving low power consumption.

In the low power consumption mode 3, in addition to the setting of the low power consumption mode 2, the gate scanning of the liquid crystal display panel is thinned out for each one frame to be performed once in n frames, the electric power of the scanning line driving circuit (GES) is reduced, and the switching periods of the switching circuit (SW1) and the switching circuit (SW2) are set to be increased by the adjustment circuit 121 of the VGH/VGL generation circuit 108, thereby achieving further low power consumption.

In the low power consumption mode 4, in addition to the setting of the low power consumption mode 3, by deactivating the source amplifier circuit 102 and the amplifier circuits of the gradation voltage generation circuit 103, the outputs of the amplifier circuits are set to the GND voltage by the switching circuits (SWD, SWR3). Furthermore, by also deactivating the common amplifier circuit 105, the output of the common amplifier circuit 105 is set to the GND voltage.

Thereby, the negative voltage applied to pixels is eliminated, and thus the VSN generation circuit becomes inactive, whereby the current is reduced. The VSP generation circuit remains active since it is necessary to output the touch panel scanning voltage (Vstc) at the time of the touch position detection.

With such combinations, low power consumption is achieved in the integral driver IC which performs the touch panel driving and the liquid crystal driving. It should be noted that the combinations of FIG. 24 are examples and low power consumption can be achieved in other combinations.

While there have been described what are at present considered to be certain embodiments of the invention, it will be understood that various modifications may be made thereto, and it is intended that the appended claims cover all such modifications as fall within the true spirit and scope of the invention.

What is claimed is:
1. A liquid crystal display device comprising:
a liquid crystal display panel that has a first substrate, a second substrate, and a liquid crystal sandwiched between the first substrate and the second substrate;
a plurality of pixels formed in a display section of the first substrate;
a plurality of pixel electrodes formed in the pixels respectively;

a plurality of pixel transistors electrically connecting with the plurality of pixel electrodes respectively;

a plurality of common electrodes respectively formed as facing to the pixel electrodes, formed in the first substrate, and used for detection of a conductor approaching or touching; and a driving circuit supplying a common voltage for displaying an image to the common electrodes and a scanning voltage for detecting the conductor to the common electrodes, wherein the display device has a first mode for displaying an image in the display section and a second mode that is a standby mode, wherein the first mode has a first period for displaying an image and a second period for detecting, wherein the second mode has a third period in which the display section is in a standby state and a fourth period for detecting, wherein the display panel detects the conductor with using the common electrodes in the second period and the fourth period, wherein the pixel transistor supplies an image signal to the pixel electrodes in the third period, and does not supply the image signal to the pixel electrodes in the fourth period, and wherein detection accuracy in the fourth period is lower than detection accuracy in the second period.

2. The liquid crystal display device according to claim 1, wherein a voltage difference between the common voltage and the image signal which is supplied to the pixel electrode in the third period is minimized.

3. The liquid crystal display device according to claim 1, wherein power consumed for detecting the conductor in the second mode is lower than power consumed for detecting the conductor in the first mode.

4. The liquid crystal display device according to claim 1, wherein scanning operations are performed for sequentially supplying the scanning voltage to the common electrodes in the second period and the fourth period, and wherein a number of the scanning operations in the fourth period is less than a number of the scanning operations in the second period.

5. The liquid crystal display device according to claim 1 further comprising:

a voltage generation circuit, wherein a voltage which is generated by the voltage generation circuit in the second mode is lower than a voltage which is generated in the first mode.

6. The liquid crystal display device according to claim 1: wherein a state of the pixel transistor is OFF state in the fourth period.

7. The liquid crystal display device according to claim 1, wherein the first mode is normal operation mode and the second mode is the standby mode.

8. The liquid crystal display device according to claim 1, wherein color of the display section is black in the third period.

9. A liquid crystal display device comprising:

a liquid crystal display panel that has a first substrate, a second substrate, and a liquid crystal sandwiched between the first substrate and the second substrate;

a plurality of pixels formed in a display section of the first substrate;

a plurality of pixel electrodes formed in the pixels respectively;

a plurality of pixel transistors electrically connecting with the plurality of pixel electrodes respectively;

a plurality of common electrodes respectively formed as facing to the pixel electrodes, formed in the first substrate, and used for detection of a conductor approaching or touching; and a driving circuit supplying a common voltage for displaying an image to the common electrodes and a scanning voltage for detecting the conductor to the common electrodes, wherein the display device has a first mode for displaying an image in the display section and a second mode that is a standby mode, wherein the first mode has a first period for displaying an image and a second period for detecting, wherein the second mode has a third period in which the display section is in a standby state and a fourth period for detecting, wherein the display panel detects the conductor with using the common electrodes in the second period and the fourth period, wherein the pixel transistor is ON state for supplying an image signal to the pixel electrodes in the third period, and is OFF state in the fourth period, and wherein detection accuracy in the fourth period is lower than detection accuracy in the second period.

10. The liquid crystal display device according to claim 9, wherein a voltage difference between the common voltage and the image signal which is supplied to the pixel electrode in the third period is minimized.

11. The liquid crystal display device according to claim 9, wherein power consumed for detecting the conductor in the second mode is lower than power consumed for detecting the conductor in the first mode.

12. The liquid crystal display device according to claim 9, wherein scanning operations are performed for sequentially supplying the scanning voltage to the common electrodes in the second period and the fourth period, and wherein a number of the scanning operations in the fourth period is less than a number of the scanning operations in the second period.

13. The liquid crystal display device according to claim 9 further comprising:

a voltage generation circuit, wherein a voltage which is generated by the voltage generation circuit in the second mode is lower than a voltage which is generated in the first mode.

14. The liquid crystal display device according to claim 9, wherein the first mode is normal operation mode and the second mode is the standby mode.

15. The liquid crystal display device according to claim 9, wherein color of the display section is black in the third period.

* * * * *